United States Patent
Smith, Jr. et al.

(10) Patent No.: US 6,687,654 B2
(45) Date of Patent: Feb. 3, 2004

(54) TECHNIQUES FOR DISTRIBUTED MACHINERY MONITORING

(75) Inventors: George A. Smith, Jr., Ellicott City, MD (US); George S. Peacock, Columbia, MD (US); George L. Vojtech, Jr., Centreville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/236,356

(22) Filed: Sep. 6, 2002

(65) Prior Publication Data

US 2003/0061008 A1 Mar. 27, 2003

Related U.S. Application Data

(60) Provisional application No. 60/318,350, filed on Sep. 10, 2001.

(51) Int. Cl.[7] .................................................. G06F 11/30
(52) U.S. Cl. ........................................ 702/183; 714/25
(58) Field of Search ............................ 702/183, 33, 34, 702/48, 54, 56, 57, 58, 59, 75, 76, 77, 81, 84, 182, 184, 185, 188; 700/9, 21, 26, 108, 110, 174; 714/1, 25, 48; 324/500, 512, 520, 531, 772, 705, 707, 718, 76.41, 76.74

(56) References Cited

U.S. PATENT DOCUMENTS

| | | | |
|---|---|---|---|
| 4,885,707 A | * 12/1989 | Nichol et al. | 702/56 |
| 4,959,638 A | 9/1990 | Palmer | 340/577 |
| 4,980,844 A | 12/1990 | Demjanenko et al. | 364/550 |
| 5,239,468 A | 8/1993 | Sewersky et al. | 364/424.03 |
| 5,251,151 A | 10/1993 | Demjanenko et al. | 364/550 |
| 5,521,840 A | 5/1996 | Bednar | 364/508 |
| 5,549,000 A | 8/1996 | Brown et al. | 73/587 |
| 5,566,092 A | 10/1996 | Wang et al. | 364/551.02 |
| 5,602,761 A | 2/1997 | Spoerre et al. | 364/554 |
| 5,710,723 A | 1/1998 | Hoth et al. | 364/551.01 |
| 5,713,540 A | 2/1998 | Gerszberg et al. | 246/121 |
| 5,804,726 A | 9/1998 | Geib et al. | 73/593 |
| 5,842,157 A | 11/1998 | Wehhofer et al. | 702/189 |
| 5,847,658 A | 12/1998 | Irie et al. | 340/683 |
| 5,875,420 A | 2/1999 | Piety et al. | 702/182 |
| 5,922,963 A | 7/1999 | Piety et al. | 73/659 |
| 5,987,990 A | 11/1999 | Worthington et al. | 73/592 |
| 6,076,405 A | 6/2000 | Schoess | 73/587 |
| 6,192,759 B1 | 2/2001 | Schoess | 73/583 |
| 6,208,944 B1 | * 3/2001 | Franke et al. | 702/56 |
| 6,216,985 B1 | 4/2001 | Stephens | 246/120 |
| 6,234,021 B1 | 5/2001 | Piety et al. | 73/592 |
| 6,301,572 B1 | 10/2001 | Harrison | 706/52 |
| 6,321,602 B1 | 11/2001 | Ben-Romdhane | 73/660 |
| 6,370,957 B1 | 4/2002 | Filippenko et al. | 73/660 |
| 6,401,057 B1 | 6/2002 | Kadtke et al. | 702/189 |
| 6,484,109 B1 | * 11/2002 | Lofall | 702/56 |
| 6,567,709 B1 | * 5/2003 | Malm et al. | 700/21 |
| 6,611,724 B1 | * 8/2003 | Buda et al. | 700/49 |
| 2002/0059831 A1 | 5/2002 | Naudet et al. | 73/579 |

\* cited by examiner

*Primary Examiner*—Marc S. Hoff
*Assistant Examiner*—Edward Raymond
(74) *Attorney, Agent, or Firm*—Francis A. Cooch

(57) ABSTRACT

Techniques for monitoring a machine for significant deviations from normal operations include collecting, at a first processing element, sensor data about the machine. The first processing element performs narrowband frequency domain processing to determine a segment of sensor data that indicates a deviation from normal operations that exceeds a threshold deviation. A message including the segment of sensor data is sent to a second processing element. In response to receiving the message, the second processing element performs different narrowband frequency domain processing to determine whether the deviation from normal operations is significant for maintaining the machine. If the deviation from normal operations is determined to be significant for maintaining the machine, then the deviation is reported to cause the machine to be maintained.

33 Claims, 13 Drawing Sheets

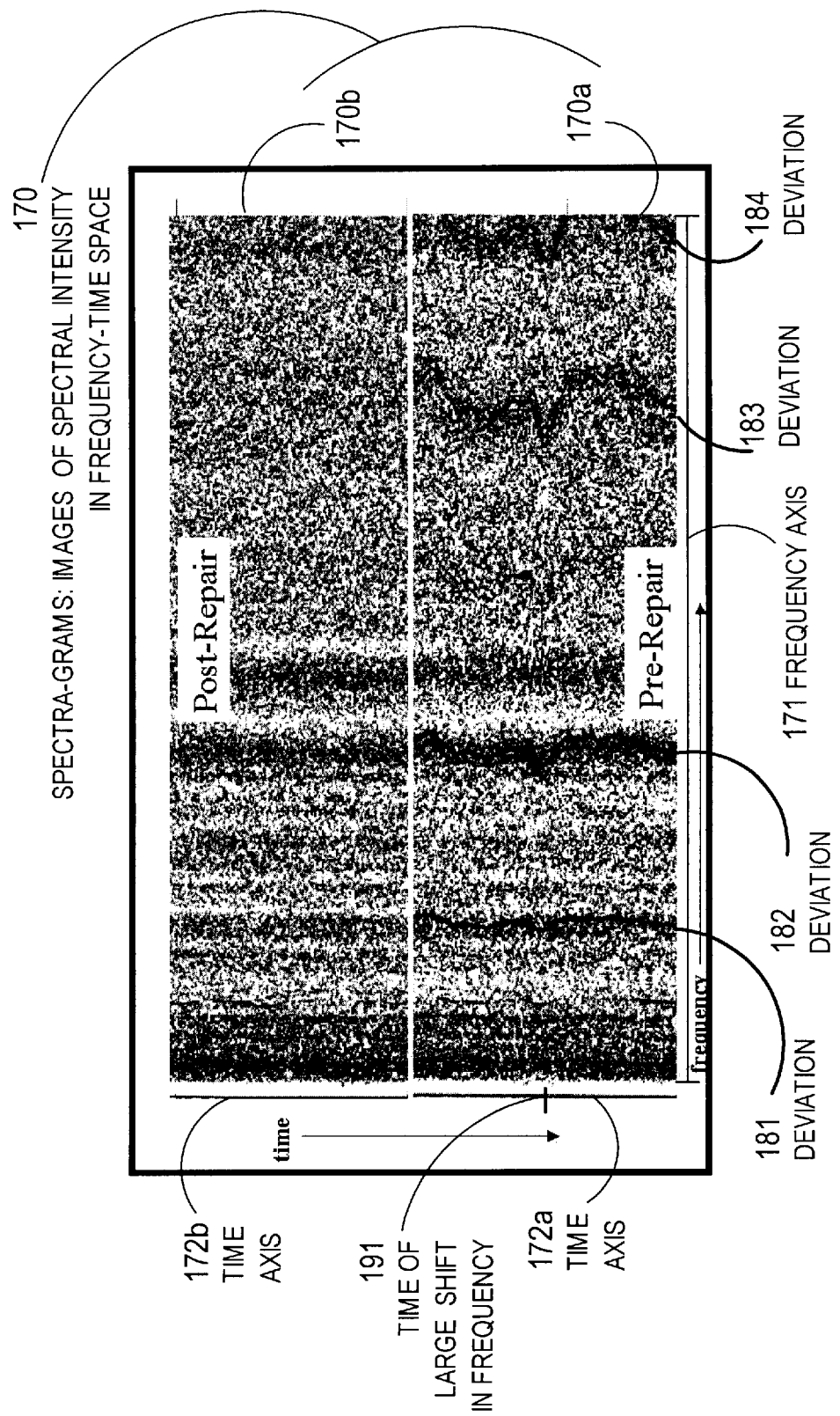

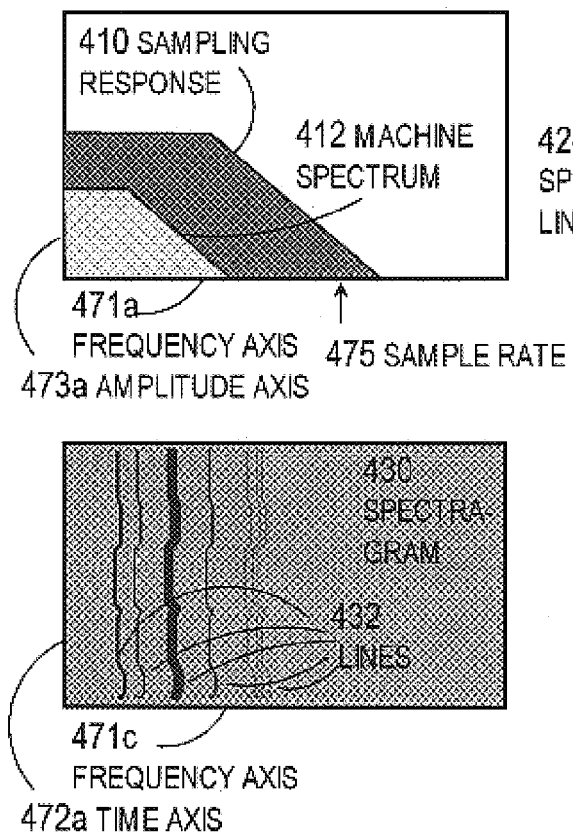
FIG. 4A
FIG. 4C
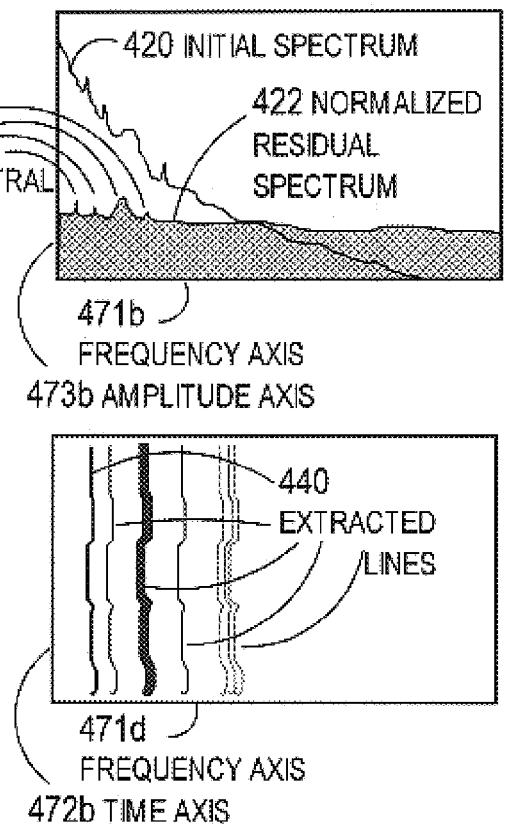
FIG. 4B
FIG. 4D

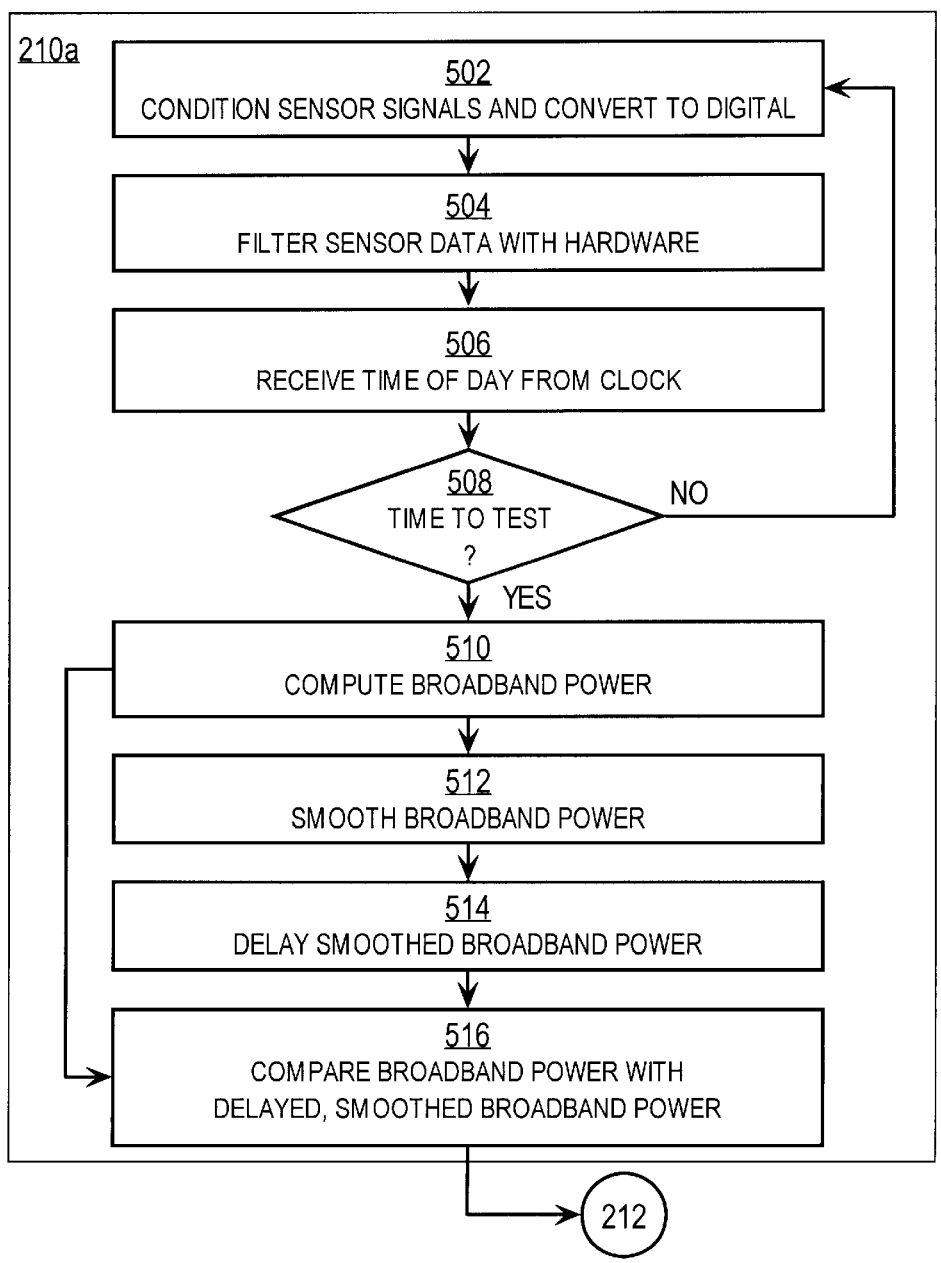

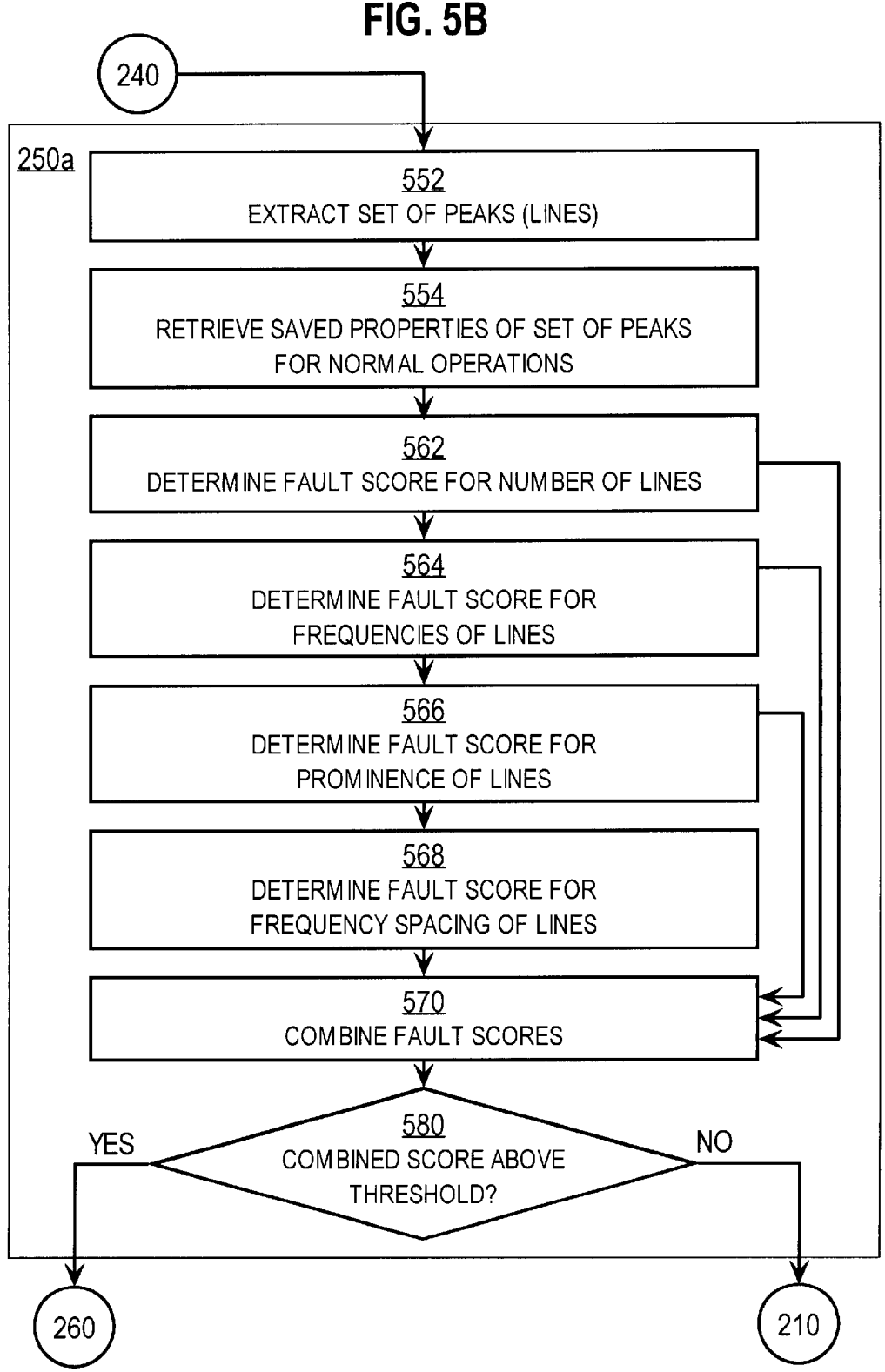

FIG. 7A
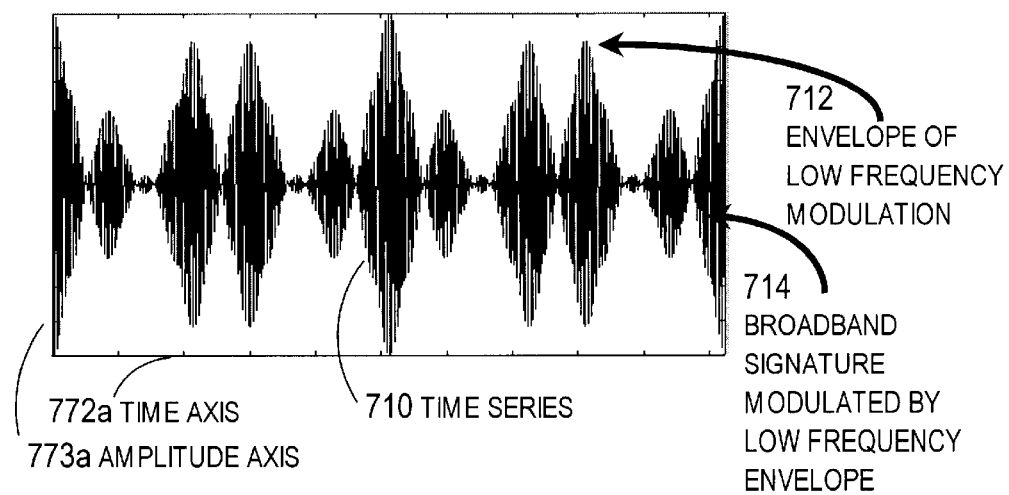
712 ENVELOPE OF LOW FREQUENCY MODULATION
714 BROADBAND SIGNATURE MODULATED BY LOW FREQUENCY ENVELOPE
772a TIME AXIS
773a AMPLITUDE AXIS
710 TIME SERIES
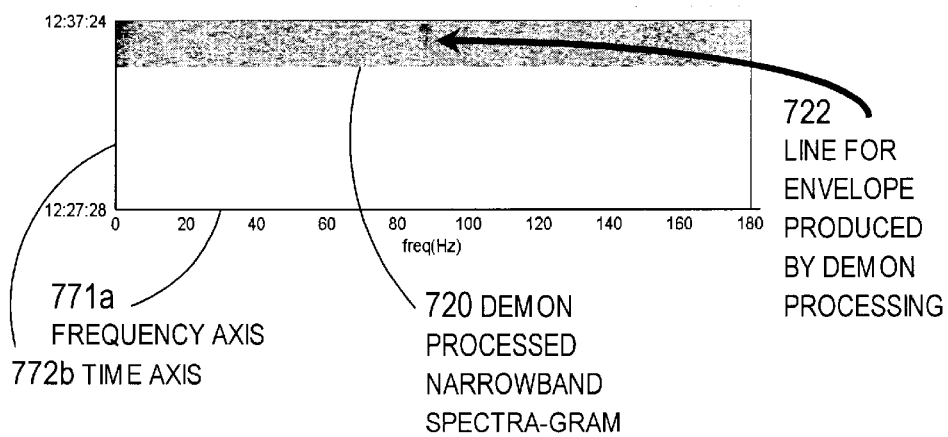
722 LINE FOR ENVELOPE PRODUCED BY DEMON PROCESSING
771a FREQUENCY AXIS
772b TIME AXIS
720 DEMON PROCESSED NARROWBAND SPECTRA-GRAM
FIG. 7B

TECHNIQUES FOR DISTRIBUTED MACHINERY MONITORING

CROSS-REFERENCE TO RELATED APPLICATIONS

This application claims the benefit of Provisional Appln. No. 60/318,350, filed on Sep. 10, 2001, the entire contents of which are hereby incorporated by reference as if fully set forth herein, under 35 U.S.C. §119(e).

BACKGROUND OF THE INVENTION

1. Field of the Invention

The present invention relates to monitoring machinery; and, in particular, to automated distributed detection of faults that constitute conditions for performing corrective maintenance before failure of the machinery.

2. Description of the Related Art

High-valued complex machinery often constitutes a major investment to its owner and is not easily replaced. Examples include consumer items such as automobiles and farm equipment, heavy equipment such as trains, cranes, drills and earthmovers, as well as special purpose factory installations such as power generators, assembly line equipment, and power train equipment, such as transmissions, for delivering power to assembly line equipment. Owners of such machinery desire to detect and correct small problems with individual components of such machinery before the small problem leads to catastrophic failure of the machine. However, it is often impractical to inspect each small component subject to failure on a frequent basis. The component may be buried deep in the machinery and require many person-hours to remove, inspect and re-install or replace. In addition to the costs of the person-hours, there is the cost of having the high-valued equipment non-operational for the duration of the inspection procedure. Such costs are only warranted when the part is sufficiently defective that failure to replace may lead to failure of the high-valued complex machine of which it is part.

There is a clear need for systems that can monitor the high-valued complex machinery for failure of individual components while the machinery is operating for its intended purpose.

One approach is to build-in special purpose sensors that detect the correct operation of each individual component, and have those sensors report when the associated component fails. This approach is impractical for many reasons and is not taken in practice. In many machines, there are so many moving components, some very small, that special purpose sensors attached to each one may interfere with required motions, violate required spatial tolerances, increase the cost of the machinery, and otherwise render the machinery unsuitable for its purpose. Another problem with this approach is that some failure modes are not determined until after the machine is built and operated, and it is impossible to guarantee a sensor that will detect such failure modes before they are discovered.

Another approach is to attach vibration sensors to the machinery and analyze vibration data from such sensors. Changes in operation of one or more components of the machinery associated with failure of that component may change one or more characteristics of the vibration data. This approach has been taken by many conventional systems. However, the changes that can be detected depend on the characteristics of the vibration data and the processing of the vibration data.

Some conventional systems process vibration data by measuring the shape and size of vibration amplitude with time. Such systems have been used to determine gross transient properties of machinery, such as firing of a circuit breaker, or approach of a train on train rails. However, such systems have not been shown to detect small changes in minor components of the machinery. Such small changes are often dwarfed by the vibrations caused by larger, more energetic components, such as drive shafts.

Some systems process vibration data by determining statistics of the vibration in the frequency domain. However, such systems have not been shown to detect small changes in minor components of complex machinery. Such small changes are often dwarfed by the vibrations caused by larger, more energetic components, in the same frequency band. Some small components may vary their frequency signature with time during normal operations, so that it is difficult, using fixed frequency bands, to distinguish normal variations from variations associated with an approaching failure of a minor component.

Based on the foregoing, there is a clear need for a machinery monitoring system that can detect problems in minor components of complex machines, which warrant maintenance actions directed to those minor components.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for monitoring a machine for significant deviations from normal operations, which indicate conditional maintenance should be performed. In one aspect of the invention, techniques include collecting, at a field processing element, sensor data about the machine. The field processing element performs narrowband frequency domain processing to determine a segment of sensor data that indicates a deviation from normal operations that exceeds a threshold deviation. A message including the segment of sensor data is sent to a base processing element. In response to receiving the message, the base processing element performs different narrowband frequency domain processing to determine whether the deviation from normal operations is significant for maintaining the machine. If the deviation from normal operations is determined to be significant for maintaining the machine, then the deviation is reported to cause the machine to be maintained.

According to another aspect of the invention, techniques include collecting, at a field processing element, sensor data about the machine. The field processing element performs first narrowband frequency domain processing to determine a segment of sensor data that indicates a deviation from normal operations that exceeds a threshold deviation. The field processing element sends a message including the segment of sensor data to a base processing element for performing different narrowband frequency domain processing to determine whether the deviation from normal operations is significant for maintaining the machine. Narrowband frequency domain processing includes normalizing a frequency spectrum for a temporal portion of sensor data. Normalizing the frequency spectrum includes determining a broad background spectrum and removing the broad background spectrum from the frequency spectrum to produce a residual spectrum. Narrowband frequency domain processing also includes determining in the residual spectrum a peak set of one or more spectral peaks that exceed a threshold amplitude.

According to another aspect of the invention, techniques include receiving at a base processing element a message including a segment of sensor data about the machine from a field processing element. The field processing element determined that the segment indicated a deviation from normal operations that exceeds a threshold deviation. In response to receiving the message, the base processing element performs first narrowband frequency domain processing on the segment of sensor data to determine whether the deviation from normal operations is significant for maintaining the machine. The first narrowband frequency domain processing is different from second processing performed in the field processing element. If the deviation from normal operations is determined to be significant for maintaining the machine, then the deviation is reported to cause the machine to be maintained. Narrowband frequency domain processing includes normalizing and determining in a residual spectrum a peak set of one or more spectral peaks that exceed a threshold amplitude.

These techniques allow the detection of subtle changes in sensor data that indicate problems in minor components of a complex machine. The techniques also allow false alarm rates to be reduced to desirable levels.

This system scales well with an increasing number of machines and machine components to be monitored because the techniques can be used to distribute the processing load by having relatively inexpensive field processors sample data and determine a segment of sensor data that indicates a problem. More expensive and more powerful base processors can then perform more sophisticated and time consuming processing on the problem segment to determine a component of the machine causing the problem and whether the component should be replaced or whether the alert amounts to a false alarm. Typically, any one field processor sends segments to the base processor infrequently—only when a potential problem is detected. Therefore one base processor can handle the segments sent by a large number of field processors. Because few messages are sent, one communication channel can handle the traffic sent by a large number of field processors.

Other systems do not scale as well with an increasing number of machines and machine components to monitor. For example, if every problem segment were processed by the field processor using the more powerful and sophisticated processing algorithms, the multiple field processors would have to be more powerful and more expensive, detrimentally increasing the cost of the system. If every segment sampled by the data sensor were sent to, and processed by, the base processor, then the communication channel is likely to become congested and the base processor is likely to be unable to process all the segments received from a large number of sensors on many machines.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is graph illustrating example spectra-grams showing narrowband features due to one or more faulty components of a machine;

FIGS. 4A, 4B, 4C, 4D are graphs illustrating some data processing at the remote unit, according to an embodiment;

FIG. 5A is a flowchart illustrating an embodiment of a step of the method depicted in FIG. 2, which screens segments of sensor data at the field unit;

FIG. 5B is a flowchart illustrating an embodiment of a step of the method depicted in FIG. 2, which determines whether a segment is sent to the base unit for further processing;

FIGS. 7A and 7B are graphs illustrating modulated source processing at the base unit, according to an embodiment;

DETAILED DESCRIPTION

A method and apparatus are described for monitoring a machine for significant deviations from normal operations that indicate conditions for conditional maintenance. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Structural Overview

Figure 1A:
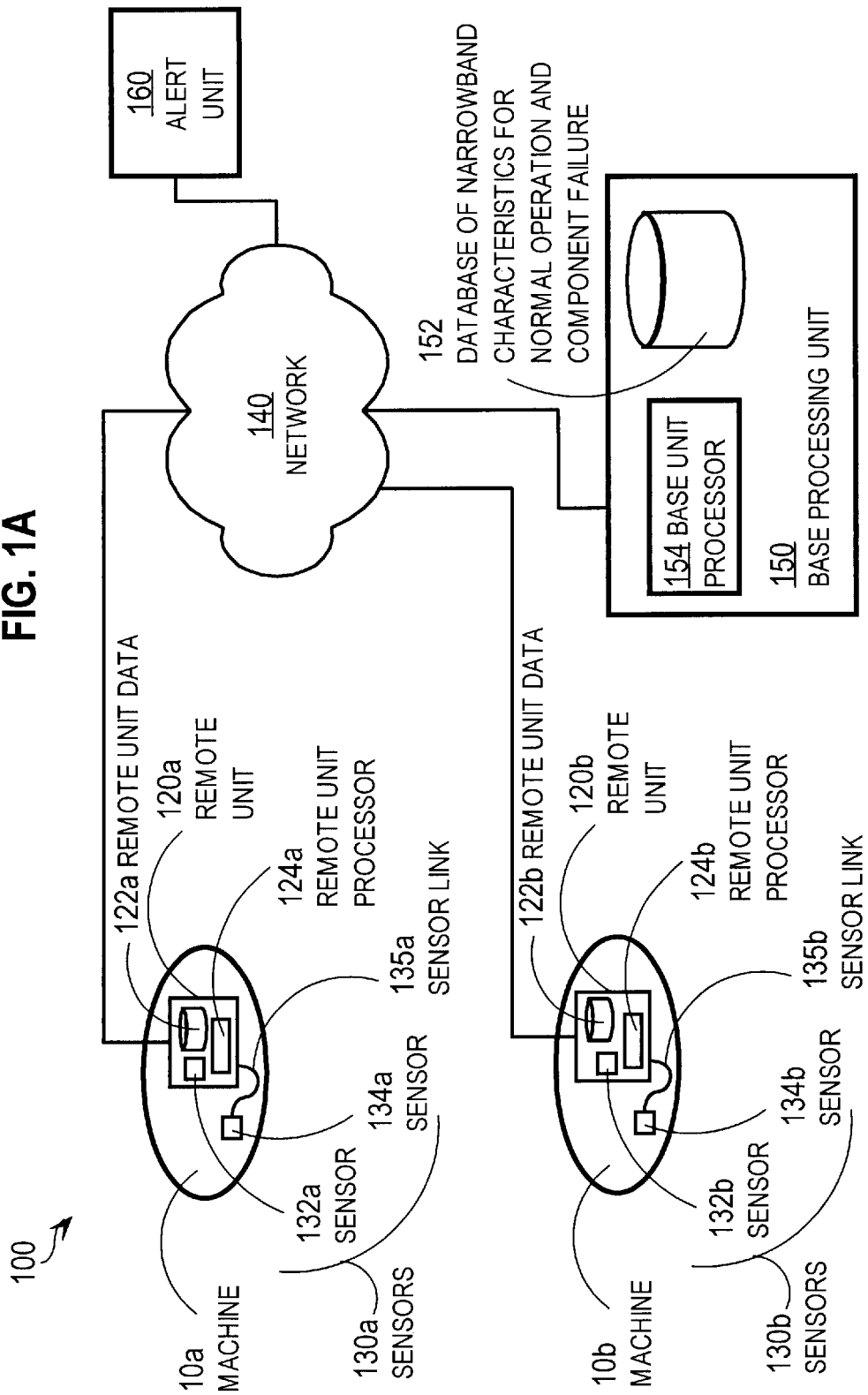
FIG. 1A is a block diagram illustrating a system for monitoring a machine for significant deviations from normal conditions, which indicate conditional maintenance for one or more components, according to an embodiment.

FIG. 1A is a block diagram illustrating a system 100 for monitoring a machine for significant deviations from normal conditions, which indicate conditional maintenance for one or more components, according to an embodiment.

As shown in FIG. 1A, a communications network 140 connects a base unit 150 with one or more remote units 120a, 120b, collectively referenced herein as remote units 120. Although two remote units 120a, 120b are depicted in FIG. 1A, in other embodiments more or fewer remote units 120 may be included in system 100. Each remote unit is placed in the vicinity of a machine, such as machines 10a, 10b, collectively referenced herein as machines 10. Although shown on different machines in FIG. 1A, in other embodiments, two or more remote units 120 may be placed in one or more locations in the immediate vicinity of the same machine 10. Although depicted in FIG. 1A in a different location than any remote unit, in some embodiments the base unit 150 may be co-located with one or more remote units 120. For this reason, the remote units can also be called "field units," because they are located with the machines 10 "in the field," whether or not they are remote from the base unit 150.

Also connected to network 140 is an alert unit 160 used to cause conditional maintenance to be performed on a machine with a defect that should be serviced. In some embodiments, the alert unit alerts a human operator that conditional maintenance should be performed on one or more components of machines 10, such as by emitting an audio or visual signal that can be perceived by a human. Although depicted in FIG. 1A, as a separate unit, in some embodiments, the alarm unit 160 is included in the base unit 150.

The network 140 is capable of transmitting messages from the remote units 120 to the base unit 150, and from the base unit 150 to the alert unit 160. Any networking technology or combination of technologies may be employed for network 140. For example, current network technologies include packet-switched digital networks, circuit-switched digital networks, and circuit-switched analog networks. In some embodiments, one or more links of network 140 are wireless links; for example, links that use electromagnetic emissions such as infrared, optical, radio, and microwave emissions as carrier waves.

Any data processing mechanisms may be used in the remote units 120, the base processing unit 150, and alert unit 160. For example, a general-purpose data processor, such as a computer central processing unit (CPU) chip may be employed with software instructions that program the processor to perform certain actions; or, one or more functions may be performed by special purpose hardware components devoted to perform those functions, such as digital signal processing (DSP) chips.

Each remote unit 120 includes a remote unit processor, 124*a*, 124*b*, collectively referenced herein as remote unit processors 124. Each remote unit 120 also includes storage for remote unit data, 122*a*, 122*b*, collectively referenced herein as remote unit data 122. The types of information included in remote unit data 122 are described in more detail below. In general, remote unit data 122 includes information about normal operations of machines 10.

Each remote unit includes links to one or more sensors 132*a*, 134*a*, 132*b*, 134*b*, collectively referenced as sensors 130, which measure physical attributes of machines 10. In some embodiments, one or more sensors, and the corresponding one or more links, are within the remote unit 120. For example, as depicted in FIG. 1A, sensors 132*a*, 132*b*, are within remote units 120*a*, 120*b*, respectively. In some embodiments, one or more sensors are external to the remote unit. For example, as depicted in FIG. 1A, sensors 134*a*, 134*b* are external to remote units 120*a*, 120*b*, respectively, but still on machines 10*a*, 10*b*, respectively. Thus each remote unit 120 is linked to one or more sensors 130 on machine 10. For example, as depicted in FIG. 1A, remote unit 120*a* is linked to sensors 132*a*, 134*a*, collectively referenced as sensors 130*a*, and remote unit 120*b* is linked to sensors 132*b*, 134*b*, collectively referenced as sensors 130*b*. Although each remote unit 120 is shown in FIG. 1A as being linked to two sensors 130, in other embodiments each remote unit is linked to fewer or more sensors.

For purposes of illustration, most examples of the various embodiments are provided in the context of acoustic data from a single acoustic sensor, but the invention is not limited to this context. Embodiments of the invention may include processing data from any sensors measuring properties of a machine with enough data samples to allow narrowband processing, including data from microphones, vibrational sensors, accelerometers, thermal sensors, magnetic sensors, electrical sensors, and electromagnetic sensors including optical and infrared sensors, among other sensors. Furthermore, in some embodiments, processing can be performed on data from any number of sensors of the same type or of different types.

The base unit 150 includes a base unit processor 154. In other embodiments the base unit 150 includes multiple processors for parallel processing. The base unit 150 also includes storage for a database 152 of narrowband and broadband sensor data characteristics for normal operations and for component failures, as described in more detail in a later section.

Each remote unit 120 samples segments of sensor data from sensors 130 and determines whether any segment indicates deviations from normal operations. If the remote unit 120 determines that a segment indicates deviations from normal operations, then the segment is sent in a data message to the base unit. The data message may also include information describing the deviation from normal operations. In some embodiments, the remote units are also linked to one or more additional data sources that provide additional information that is not subjected to acoustic spectral processing. The additional information is used to assist in diagnosing a cause of defective operation. For example, in a remote unit linked to acoustic sensors and disposed in an automobile, the additional information may include sensor identification, time of day, speed of vehicle, oil pressure, engine temperature, and amperage output from an alternator, and electronic output from one or more onboard computers, among other data. In some embodiments, some or all of the additional information is included in the message sent to the base unit 150.

Each base unit further processes the segment using more complex algorithms to classify the deviations into various classes that indicate any conditional maintenance servicing to perform. The base unit applies narrowband and broadband processing to classify the deviations. If the base unit determines that maintenance servicing should likely be performed on one or more components of the machine, then an alert message is sent to the alert unit to cause the maintenance to be performed. Typically, the alert unit signals a human operator to perform the maintenance within a particular amount of time.

2. Functional Overview

FIG. 1B is graph illustrating example spectra-grams 170 showing narrowband features in acoustic sensor data due to one or more faulty components of a machine. Each has the same horizontal frequency axis 171, extending from lowest frequency on the left to highest frequency on the right. Along each horizontal slice of the spectra-gram, one narrowband spectrum is displayed for which narrowband spectral intensity is indicated by a grayscale value, with higher intensity having a darker grayscale value than low intensity. Any narrowband processing sufficient to bring out these features may be used. Successive spectra are shown arranged in time order, along the time axes, 172*a*, 172*b* (collectively referenced as time axes 172). On each time axis 172, time increases downward.

A peak in and individual narrowband spectrum appears as a dark spot. The broader the peak is in frequency, the thicker is the spot. The higher the peak is in amplitude, the darker is the spot. Peaks that persist in time across successive spectra are sometimes called lines and lead to linear features in a spectra-gram that are often readily apparent to a human observer.

The lowermost spectra-gram 170a, shows narrowband features detected in a machine with a defective component. In this example, the machine is a four-wheel drive light truck with a defective wheel bearing in the rear, passenger side wheel. The uppermost spectra-gram 170b, shows normal operations after the defective component is repaired. Normal operations, before the component became defective, are expected to show similar features. For purposes of illustration, some deviations from normal operations are marked. Deviations 181, 182, 183, 184 are associated with peaks that are persistent in time and darker than similar frequencies observed during normal operations. Note that at time 191, the dark lines associated with deviations 182, 183, 184 shift to lower frequencies and then return to higher frequencies.

While the human optical system is adept at observing and tracking the example deviations, some deviations are too subtle to be readily observed by humans. In any case, the human is not adept at maintaining focus on such a spectra-gram for hours on end or in detecting deviations that arise slowly over several hours. In addition, conventional machine monitoring systems do not adequately detect and track narrowband deviations associated with some modes of component failure. In particular, variations in machine operating rate can lead to wide changes in the frequencies associated with peaks. Thus processing systems that focus on a fixed frequency range may be unable to properly detect deviations from normal operations in machinery with variable rates of operation, such as automobiles.

2.1 Remote Unit Functional Overview

Figure 2:
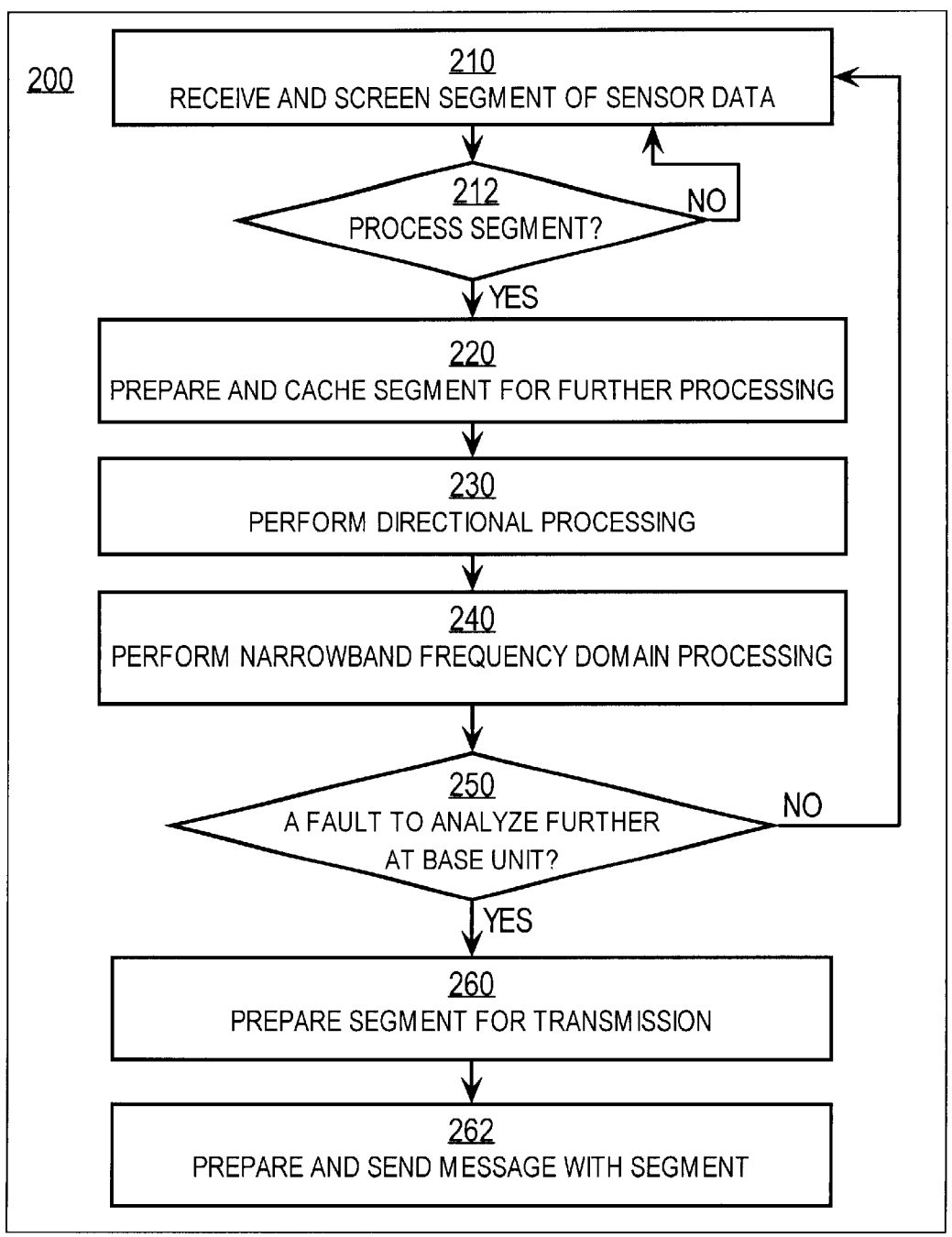
FIG. 2 is a flowchart illustrating a high level overview of a method for processing sensor data at a remote, field unit, according to an embodiment.

FIG. 2 is a flowchart illustrating a high level overview of a method 200 for processing sensor data at a remote unit 120, according to an embodiment. Although steps are shown in FIG. 2 and subsequent flowcharts in a particular order, for simplicity of explanation, in other embodiments some steps may be performed in a different order, or overlapping in time. In some embodiments, some or all the actions taken during these steps are performed by special designed circuits, which may be implemented as integrated microcircuits ("chips").

In step 210 sensor data is received at the remote unit processor 124 and screened. Any method to receive and screen the sensor data may be employed. According to one embodiment, step 210 includes amplifying and filtering analog sensor data, converting analog signals to digital signals, and determining whether to capture a segment of data for further processing at the remote unit. An embodiment of the data capture decision is described in more detail below with reference to FIG. 5A.

Step 212 is a decision point representing different branches to be taken based on the screening performed in step 210. If the segment of sensor data is screened out, control returns to step 210 to receive and screen the next segment of sensor data, either from the same sensor or from a different sensor linked to the remote unit. If the segment is not screened out, but is to be processed further at the remote unit, control passes to step 220.

In step 220, the segment of sensor data is prepared for further processing and stored in a temporary storage area for easy access called a "cache." To store data in a cache is to "cache" the data. Any method for preparing the data may be employed.

In one embodiment, the data are scaled and buffered as preparation for processing by a fast Fourier transform (FFT) well known in the art. The FFT operates on portions of a data segment that include a number of samples that is a power of two. Buffering refers to providing amplitudes for one or more extra sample to bring the total to a power of two. To prevent introducing spurious high frequency amplitudes, amplitudes in the portion of the data segment are scaled to match properties at the first and last sample in the portion. FFT, scaling and buffering, well known in the art, are described, for example, in "Sonar Signal Processing" by Richard O. Nielsen and published in 1991 by Artech House, Norwood Mass. (hereinafter Nielsen), among others.

In step 230 the sensor data is processed to provide directional information using any method known in the art. For example if multiple sensors are arranged spatially over a machine in an array of known dimensions, information about the direction of arrival of particular frequencies can be inferred. Such information can be useful is distinguishing among several components with similar narrowband features in the same complex machine. Directional processing is described, for example, in Nielsen", among others. In some embodiments, step 230 is omitted.

In step 240 narrowband frequency-domain processing ("narrowband processing") is performed. In some embodiments, some or all the actions taken during step 240 are performed by digital signal processing (DSP) chips. FIGS. 4A, 4B, 4C, 4D are block diagrams illustrating some aspects of narrowband processing at the remote unit, according to an embodiment.

FIG. 4A illustrates sampling that is appropriate for narrowband processing. A typical machine broadband spectrum 412 is given in amplitude-frequency space. The frequency axis 471a is horizontal and the amplitude axis 473a is vertical. The machine broadband spectrum is relatively flat at the lower frequencies; and, above a middle frequency, begins to decrease with increasing frequency. To properly sample this range of frequencies, a sensor is used that can measure variations (peaks) above the broadband spectrum. The sensor should have a relatively flat response to a frequency where the broadband amplitudes are negligible. The sensor may decrease with frequency at higher frequencies. The sampling rate 475 (expressed in reciprocal seconds) should be high enough to measure frequencies of interest. The sensor and sensor data segment capture process determine the sampling response 410. As shown in FIG. 4A, the sampling response is adequate to measure the broadband spectrum of the machine plus rather large peaks above the broadband spectrum.

A different spectrum is taken for each time portion of the data segment. The duration of the time portion is sufficient to sample the frequency resolution of interest in the broadband spectrum. For example, acoustic sensor data typically is taken to cover the frequency range from about 40 cycles per second (Hertz, "Hz") to about 40,000 Hz, and a resolution of 1 Hz is usually sufficient to resolve the various narrowband components. Portions of 1.0 second are sufficient to measure frequency at this resolution. Therefore a segment of one or two minutes duration is divided into portions, each of about 1.0 second in duration. The sampling rate to cover 40,000 Hz is about 80,000 samples per second. The FFT works on a number of samples that is a power of two, so this influences the actual duration. For example, when the number of samples in a portion is about 65,636 (a power of 2), then the portion has a duration of about 0.8192 seconds and a spectral resolution of 1.221 Hz. In many embodiments, portions overlap each other by about half a portion's duration. Thus a 1 second portion that provides a spectrum and resolves about 1 Hz is obtained every 0.5 seconds FIG. 4B illustrates example intermediate results in amplitude-frequency space during narrowband processing of one spectrum. The frequency axis 471b is horizontal and the amplitude axis 473b is vertical. In the illustrated example, the frequency axis 471b extends over only a portion of the frequency axis 471a in FIG. 4A where the sampling response 410 is flat. A typical machine initial spectrum 420 in narrow frequency bands is plotted. The machine broadband spectrum for the portion of the segment is subtracted from the initial spectrum to give the normalized residual spectrum 422. Any method known in the art to generate the broadband spectrum may be used. The process of subtracting a broadband spectrum from the narrowband initial spectrum to produce the residual spectrum is called "normalization." Narrow peaks discernable in the initial spectrum 420 are easily determined in the residual spectrum by establishing a threshold amplitude. Each narrowband amplitude that rises above the threshold contributes to a peak. Neighboring narrowband amplitudes above the threshold add to the width of a peak. The height of the narrowband amplitude above the threshold contributes to the strength of a peak. As shown in FIG. 4B, a threshold parallel to and just above a floor of the residual spectrum 422 would indicate a set of four or more peaks of varying width and height. Persistent peaks, found in most spectra in a data segment would be called spectral lines. It is assumed, for purposes of illustration, that the four peaks labeled spectral lines 424 persistently appear in spectra for many portions of the data segment. In some embodiments, the broadband characteristics that are computed during the normalization process are also saved and transmitted to the base unit.

FIG. 4C illustrates an example spectra-gram. The frequency axis 471c is horizontal and a time axis 472a is vertical, with time increasing downward. Dozens to hundreds of residual spectra corresponding to sequential portions of the data segment are combined in order. In addition to many dark and light spots on the spectra-gram, indicated in FIG. 4C by the uniform gray area, the persistent peaks (lines 432) appear as linear features. As shown in FIG. 4C, about seven lines 432 include, in order of increasing frequency, a dark narrow line, a lighter narrow line, a dark thick line, another lighter narrow line, and a set of three, close-in-frequency, light narrow lines.

FIG. 4D illustrates example extracted lines 440 from the remote unit narrowband processing. The frequency axis 471d is horizontal and the time axis 472b is vertical, with time increasing downward. Characteristics of the extracted lines, i.e., persistent peaks, are saved, at least temporarily, to compare to persistent peaks found during normal operations. It is assumed, for purposes of illustration, that the characteristics of the set of persistent peaks include the number of lines, a central frequency or frequency range for each line, an amplitude or strength for each line, and a characterization of frequency spacing between neighboring lines, such as a range of frequency spacing, or a mean and root-mean-square variation of frequency spacing. Frequency spacing is kept in this example to characterize the orderly arrangement of the extracted peaks; for example, the frequency ranges of the three close-in-frequency peaks may overlap, but the spacing between the three peaks is rather constant.

Returning to FIG. 2, the processing described above with reference to FIGS. 4A, 4B, 4C, 4D is accomplished in step 240, in which narrowband processing is performed.

In step 250, it is determined whether to send the segment of data to the base unit for further processing. Simple and robust clues are employed to select only the segments that most probably indicate some maintenance on the machine is desirable. In many embodiments, the characteristics of lines extracted from the segment are compared to characteristics of lines for normal operations, which are stored in the remote unit data 122. For example, if the results from the narrowband processing show deviations that do not exceed a threshold deviation, then it is determined not to send data to the base unit for further processing and control returns to step 200 to receive and screen another segment of sensor data. If the results from the narrowband processing show deviations that do exceed the threshold deviation, then it is determined to send data to the base unit for further processing and control passes to step 260. More details on an embodiment of step 250 are described in a later section with reference to FIG. 5B.

In step 260, the segment of data from the sensor is prepared for transmission to the base unit over network 140. For example, the data is scaled, buffered, compressed, or companded, or subjected to some combination of these actions, as is well known in the art of transmitting time series data. Control then passes to step 262.

In step 262, a message is prepared that includes the data, and the message is sent over the network 140 to the base unit 150. In various embodiments, the message includes the sensor data, an identification tag for the senor from which the sensor data came, the time of day, and the deviations from the peak characteristics of normal operations, which led to the decision to send the message, among other information.

2.2 Base Unit Functional Overview

Figure 3:
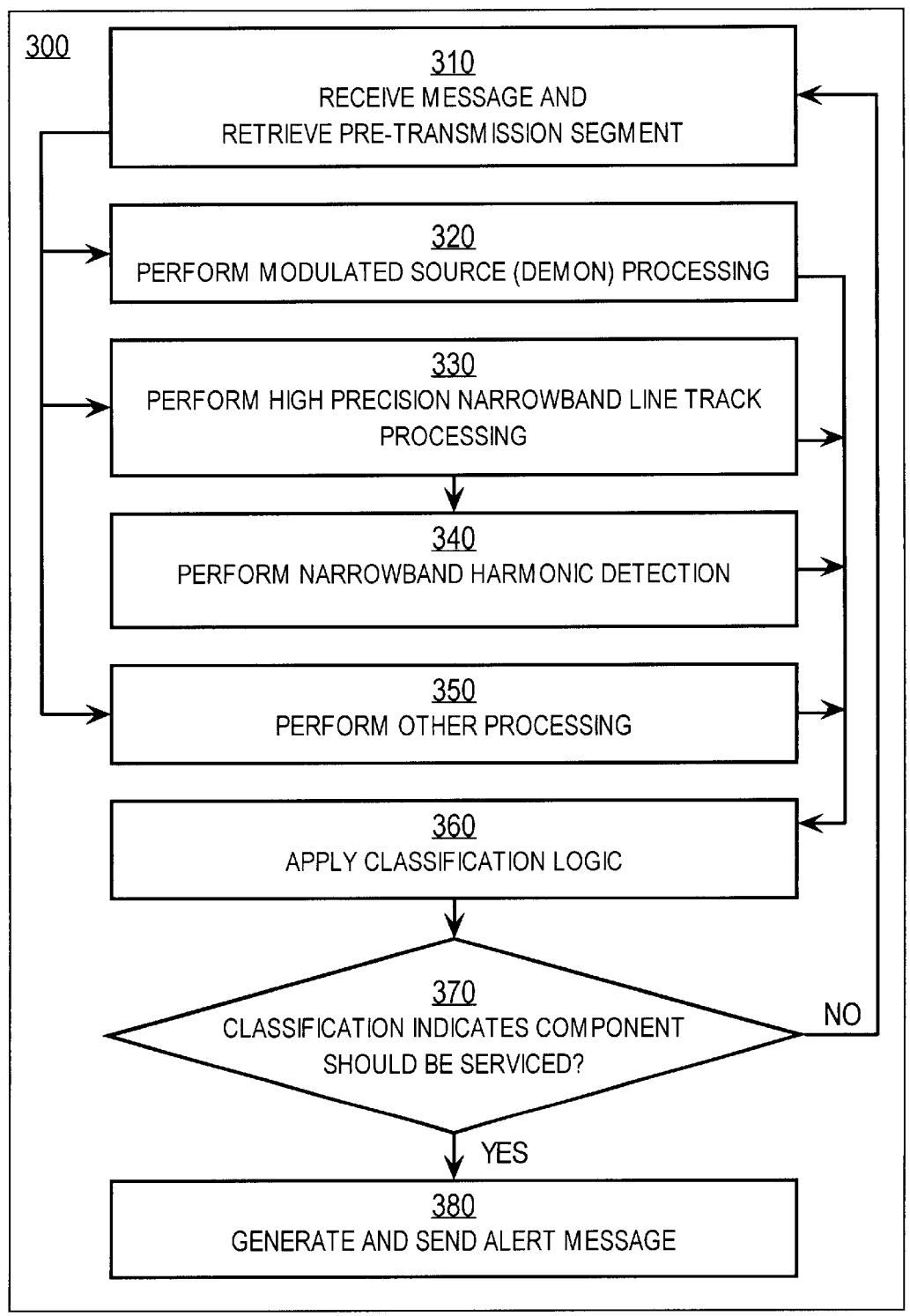
FIG. 3 is a flowchart illustrating a high level overview of a method for processing sensor data at a more powerful base unit, according to an embodiment.

FIG. 3 is a flowchart illustrating a high level overview of a method 300 for processing sensor data at a more powerful base unit, according to an embodiment.

In step 310, the message is received from a remote unit and the sensor data is retrieved. Inverse operations for the operations performed during step 260, to prepare the data for transmission, are performed on the data in the message in order to recreate the data segment. For example, the data is un-scaled, un-buffered, decompressed, or decompanded, or subjected to some combination of these actions. Control then passes to one or more of steps 320, 330, 340 and 350, either serially, or in parallel, or in some combination. In the illustrated embodiment, steps 320, 330 and 350 are performed in parallel, while step 340 is performed after step 330 is at least partially complete.

In step 320, modulated source processing (also called "DEMON" processing) is performed. Often, the broadband acoustic signatures of rotational machinery are modulated by lower frequency rotational rates, below the acoustic band. DEMON processing provides a mechanism to track the lower frequency modulation rates, and is described in more detail in a later section with reference to FIG. 7A and FIG. 7B. In some embodiments, output and control passes to step 360. In some embodiments output is saved for use in step 360 and control passes to step 330. In some embodiments, DEMON processing is also performed at one or more remote units, typically with lower frequency resolution.

In step 330, the base unit performs more computationally intensive narrowband processing and tracking of lines across multiple spectra. In some embodiments, some or all the actions taken during step 330 are performed by digital signal processing (DSP) chips. The narrowband processing involves normalization of the spectra, as described above with respect to FIG. 4B. In some embodiments, the initial and residual spectra are computed at higher frequency resolution, i.e. at narrower frequency bands, in the base unit than employed at the remote unit. In some embodiments, the sets of peaks determined during the normalization and shareholding steps are assembled automatically into tracks that follow the evolution of a set of peaks across multiple residual spectra, including following related peaks across different frequencies (and directions, if directional processing is included). More information about the automatic tracking of lines is provided in a later section with reference to FIGS. 6A, 6B, 6C, 6D and FIG. 9A.

In step 340, narrowband harmonic structures are detected. Output from the narrowband detection and tracking of lines is used as input for this step. Harmonic structures may appear during normal operations, or during operations with faulty components, or both. Harmonic structures can be used to distinguish one component of the machine from a different component of the machine. More information about narrowband harmonic structure detection is provided in a later section with reference to FIG. 8.

In step 350 other processing is performed. For example directional processing is performed for the higher precision narrowband frequencies that are processed in step 330.

In step 360, the output from steps 320, 330, 340, 350 are employed to classify the deviation from normal operations into one or several classes. Each class is associated with either normal operations or with one or more faulty components of the machine 10. More information about applying classification logic is provided in a later section with reference to FIG. 9B.

In step 370 it is determined whether the classifications indicate that conditional maintenance should be performed, such a servicing one or more particular components of the complex machine. If not, control passes back to step 310 to receive the next message from a remote unit. If so, control passes to step 380.

In step 380, an alert message is generated and sent to the alert unit 160. In some embodiments, the alert message indicates the classification that led to the alert, the associated component or components of the machine, and the type of maintenance to be performed.

These techniques allow the detection of subtle changes in sensor data that indicate problems in minor components of a complex machine. Because the processing is distributed over a number of remote units that increases with the number of machines, this system scales well with an increasing number of machines and machine components.

3. Details of Remote Unit Processing 3.1 Screening Segments

FIG. 5A is a flowchart illustrating an embodiment 210a of step 210 of the method depicted in FIG. 2, which screens segments of sensor data at the remote unit. This screening is based on detecting an increase in broadband power. For example, this screening would process acoustic sensor data in the remote unit only when the machine suddenly begins to run more loudly.

In step 502 sensor signals are conditioned and converted to digital signals. Any method known in the art for conditioning signals and converting to digital signals may be employed. The digital sampling rate should be sufficient to resolve the frequencies of interest for the machine to be monitored. In some embodiments, step 502 includes applying sensor health checks to determine whether a sensor has likely failed; such checking prevents a sensor failure from being interpreted as a machine component failure. In the illustrated embodiment, the conditioning and analog to digital (A/D) conversion is implemented in hardware, such as an application-specific integrated circuit (ASIC) included in the remote unit.

In step 504, the digital sensor data is filtered to pass the frequencies of interest for the machine being monitored. For example, a third octave filter with weights optimized for the frequencies of interest is applied. In the illustrated embodiment, the filtering is done in hardware, such as a DSP chip.

In step 506, the time of day is received. In the illustrated embodiment, the time of day is received from a hardware clock included in the remote unit. The time of day is used for sampling segments according to a predetermined schedule.

In step 508 it is determined whether the current time is a time to process a segment of sensor data. For example, it is determined whether the current time is listed in the predetermined schedule. If not, control passes back to step 502 to condition and convert the next set of sensor data. However, if it is time to process a segment of sensor data, control passes to step 510.

In step 510, the broadband power for one portion of the segment is determined. For example, a sum of the weighted outputs from the third octave filter is computed as a measure of the broadband power for the portion. The broadband power for the portion of the segment is used in step 516, described below. The value can be stored in cache or sent on a bus to an input port of an integrated circuit that performs the actions of step 516.

In step 512, a sequence of broadband power values for multiple portions of the data segment are smoothed to obtain a background level of broadband power over the recent past. For example, a low pass filter is applied to the sequence of broadband power values to obtain the background power level.

In step 514, the low pass output is delayed so that the broadband power most recently computed in step 510 can be compared to the recent past background power level.

In step 516, the delayed background power level is compared to the broadband power level of the most recent portion of the data segment. For example, the difference is computed. This information is used in step 212 to determine whether to process a data segment in the remote unit. For example, if it is determined in step 212 that the difference is not greater than a threshold change, then the segment is not captured and control returns to step 502. If it is determined in step 212 that the difference is greater than the threshold change, then control passes to step 220 of FIG. 2 to capture the segment of sensor data.

In some embodiments, steps 506 and 508 are omitted, and every segment of sensor data is checked for increases in broadband power, without regard for the time of day.

3.2 Decision Logic

FIG. 5B is a flowchart illustrating an embodiment 250a of step 250 of the method depicted in FIG. 2, which determines whether a segment processed at the remote unit is also sent to the base unit for further processing.

In step 552 a set of persistent peaks is extracted for the segment. Any method for determining persistent peaks may be used. For example, the frequency axis may be divided into a large number of frequency bands. All peaks found among all portions of the segment in each small frequency band can be averaged to get average values for peak characteristics in the band. Peak characteristics may include, for example, the number of peaks in the band, an average height of the peaks in the band, an average width of peaks in the band, and an average frequency for peaks in the band, among others. A band that does not have a persistent peak will show small values for theses characteristics, e.g., a number of peaks much less than one, or an average peak height that is not far above the threshold for detecting a peak, for example. In some embodiments, especially in high noise environments, a frequency band will be averaged with the same band in near time portions of segments or segments; this averaging stabilizes the peaks, and makes the above parameter estimation more robust. If the narrowband processing of step 240 includes modulated source processing ("DEMON processing"), then one or more DEMON peaks may be included among the persistent peaks.

In step 554, values of characteristics for a set of persistent peaks for normal operations are retrieved from the remote unit data. The characteristics may include a number of persistent peaks, the number in each frequency band, an average height or a range of heights for each persistent peak, an average width or a range of widths for each persistent peak, and an average frequency or a range of frequencies for each persistent peak, among others. In some embodiments, step 554 includes retrieving one or more values of characteristics for sets of persistent peaks known to occur during faulty or degraded operations when maintenance should be performed.

Any method for determining values for normal and degraded operations may be used. In some embodiments, values for normal operations may be accumulated over time. In some embodiments, values during degraded operations may be developed by analysts, or accumulated over time and classified by analysts, or classified automatically using well-known objective analysis techniques such as cluster analysis.

The values of characteristics for the set of peaks of the current portion or segment are compared to those values for the set of peaks for normal operations, or to one or more sets of peaks for known faulty operations, or to some combination. Deviations from values for normal or degraded operations are scored based on a knowledge base for machine operations. The scores are combined, and the combined score is used to determine whether it is likely that machine operation has degraded to a point that maintenance may be required. If so, the segment is sent on to a base unit for further processing.

In the embodiment illustrated in FIG. 5B, scoring is based on the number of peaks, the frequency of the peaks, the frequency spacing between peaks and the predominance of the peaks, for the persistent peaks. Random noise should not generate persistent peaks. If the set of extracted peaks include the peaks in only a single portion of the segment, random noise is not likely to generate the right number of peaks with the right spacing at the right frequencies. Thus random noise is not likely to be mistaken for an actual mode of machine operation, either normal or degraded.

In the following description of the illustrated embodiment, a fault score is determined for several characteristics of a set of peaks. In some embodiments the larger the fault score the more likely that machine maintenance is desirable; in other embodiments, the smaller the fault score the more likely that machine maintenance is desirable. For purposes of illustration, it is assumed that the larger the fault score the more likely that machine maintenance is desirable.

In step 562 a fault score is determined based on the number of peaks in the set of persistent peaks extracted in step 552. The number of peaks is compared to the number of peaks in normal operations; the larger the difference the greater the fault score. In some embodiments, the number of peaks is compared to the number of peaks in degraded operations; the smaller the difference the greater the fault score. The output is passed to step 570, described below, to combine the fault scores. In some embodiments, control passes to step 570 along with the output; in other embodiments control passes to one or more of steps 564, 566, 568 to perform these steps in series or in parallel. In the illustrated embodiment, control passes to step 564.

In step 564 a fault score is determined based on the frequency of each peak in the set of persistent peaks extracted in step 552. The frequency of each peak is compared to the frequency of a corresponding peak in normal operations; the larger the difference the greater the fault score. In some embodiments, the frequency of each peak is compared to the frequency of a corresponding peak in a set of peaks for degraded operations; the smaller the difference the greater the fault score. Any method may be used to determine corresponding peaks. Based on the knowledge base, the frequency difference for one peak in a set of peaks may be weighted more heavily than the frequency difference for another peak in the set of peaks. The output is passed to step 570, described below, to combine the fault scores. In the illustrated embodiment, control passes to step 566.

In step 566 a fault score is determined based on the prominence of each peak in the set of persistent peaks extracted in step 552. In various embodiments, the prominence is related to the height or width of the peak above the threshold used to detect peaks, or both the height and the width. The prominence of each peak is compared to the prominence of a corresponding peak in normal operations; the larger the difference the greater the fault score. In some embodiments, the prominence of each peak is compared to the prominence of a corresponding peak in a set of peaks for degraded operations; the smaller the difference the greater the fault score. Any method may be used to determine corresponding peaks. Based on the knowledge base, the prominence difference for one peak in a set of peaks may be weighted more heavily than the prominence difference for another peak in the set of peaks. The output is passed to step 570, described below, to combine the fault scores. In the illustrated embodiment, control passes to step 568.

In step 568, a fault score is determined based on the spacing between two or more peaks in the set of persistent peaks extracted in step 552. The spacing is compared to the spacing of corresponding peaks in normal operations; the larger the difference the greater the fault score. In some embodiments, the spacing is compared to the spacing of corresponding peaks in a set of peaks for degraded operations; the smaller the difference the greater the fault score. Any method may be used to determine corresponding peaks. Based on the knowledge base, the spacing difference for one pair of peaks in a set of peaks may be weighted more heavily than the spacing difference for another pair of peaks in the set of peaks. The output is passed to step 570, described below, to combine the fault scores. In the illustrated embodiment, control passes to step 570.

In step 570, the fault scores are combined to generate a combined fault score that reflects a total deviation from normal conditions for the machine being monitored. For example, in one embodiment, the fault scores determined in steps 562, 564, 566, 568 are added together to generate the combined fault score.

In step 580, the combined fault score is compared to a threshold combined fault value. If the combined fault score exceeds the threshold value, then a problem requiring maintenance is likely and control passes to step 260 of FIG. 2. If the combined fault score does not exceed the threshold value, then a problem requiring maintenance is not likely, and control passes back to step 210 of FIG. 2.

4. Details of Base Unit Processing

If the combined fault score determined at the remote unit exceeds a threshold value, then a problem requiring maintenance is likely, and a message is sent to the base unit, as described above with reference to FIGS. 2 and 5B. At the base unit, the message is processed as described above with reference to FIG. 3. In this section additional details are described for embodiments of steps depicted in FIG. 3.

4.1 DEMON Processing

FIGS. 7A and 7B are graphs illustrating modulated source processing at the base unit during step 320, according to an embodiment. Modulated source processing (also called DEMON processing) provides valuable information for the detection of machine problems. Often the broadband acoustic signatures (vibration signals averaged over frequencies from about 40 Hz to about 40,000 Hz) of rotational machinery are modulated by lower frequency rotational rates (for example rotational frequencies from about 1.0 to about 60 Hz). The modulating sources can be shaft rotation rates, gear mesh rates, or other mechanical sources. FIG. 7A is a graph of sensor data amplitude as a function of time for an example time series 710. The amplitude axis 773a is vertical and the time axis 772a is horizontal. The outer envelope 712 of time-varying amplitude changes depicted in FIG. 7A constitutes one or more low frequency signals, such as a shaft rate, that modulate the higher frequency broadband signatures 714 of the machinery.

DEMON processing is used on many passive sonar systems that track underwater objects, and is described, for example, in Nielsen, cited above, among other references. During DEMON processing, the time series is rectified, by either cutting off or reflecting sensor amplitude excursions below a mean or zero value. The resulting rectified signal is then processed using narrowband processing to produce a spectra-gram that has a persistent peak associated with a component of the low frequency modulating signal. FIG. 7B is an example spectra-gram 720 produced by DEMON processing of the time series depicted in FIG. 7A. A time axis 772b is vertical and a frequency axis 771a is horizontal. A persistent peak (line) 722 is detected in the spectra-gram 720. The persistent peak 722 corresponds to one or more of the low frequency signals, such as a shaft rate, that modulate the higher frequency broadband signatures of the machinery.

In some embodiments DEMON processing at a lower frequency precision than performed on the base unit is also performed on one or more remote units and considered for a fault score and included in the combined fault score on the remote unit.

4.2 Harmonic Structure Processing

Rotational machinery acoustic signatures typically exhibit significant harmonic structure. The harmonic structure can be especially evident in a machine with a maintenance problem that should be serviced. Harmonic narrowband processing (also called multi-harmonic processing) is a technique that has been successfully used in passive sonar systems to identify unique harmonic structures that help identify underwater objects, and described, for example, in Nielsen, cited above. This technique works on weak harmonic signals in the presence of clutter (such as random peaks). The processing integrates detection energy in harmonically related frequency bins. Detection energy is related to amplitude above the threshold for detecting narrowband peaks. Harmonically related frequency bins are separated by a constant frequency difference that is related to a fundamental frequency, such as a rotation rate or a gear reduced rotation rate or a gear expanded rotation rate. The integrated energy is then compared to a threshold selected to prevent false detection of harmonics in the presence of background clutter, such as random peaks. This technique allows weak harmonic signals to contribute to a fault score while reducing the chances that clutter will lead to a detection of a harmonic signature.

Figure 8:
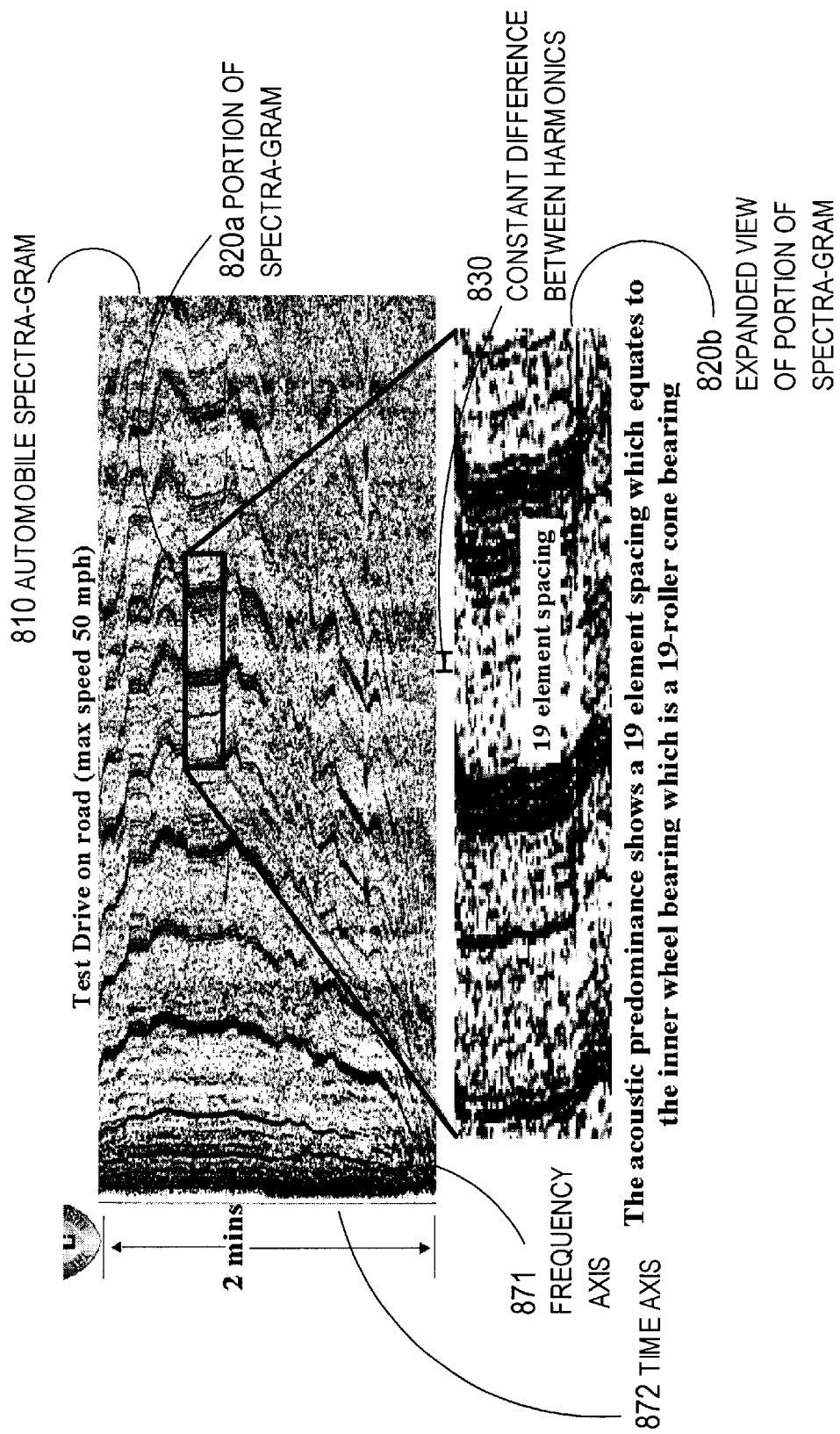
FIG. 8 is a graph illustrating harmonic structure determined at the base unit, according to an embodiment.

FIG. 8 is a graph of a high-precision narrowband spectra-gram 810 and an expanded view 820b of a portion 820 of the spectra-gram, which illustrate harmonic structure determined at the base unit during step 340, according to an embodiment. In the illustrated embodiment, the spectra-gram 810 is for acoustic sensor data from an automobile (a four wheel drive, light truck) while the automobile is test driven with a maximum speed of 50 miles per hour (Mph) on a road. The frequency axis 871 is horizontal and represents acoustic frequencies. The time axis 872 is vertical and represents spectra for a two minute segment of sensor data. As is evident in the expanded view 820b of the portion 820 of the spectra-gram 810, a series of lines (persistent peaks) are evenly spaced in frequency. The short bar 830 indicates the constant frequency spacing between lines. The even spacing is characteristic of harmonic structure.

The pattern of predominance repeats about every nineteen (19) lines indicating a 19-element harmonic structure. A component of the automobile with 19 elements is an inner wheel bearing, which has 19 rollers in a cone shaped cage. An outer wheel bearing has 14 rollers in a cage. Therefore, in the illustrated example, the 19-element structure indicates a signature of the inner wheel bearing assembly of the automobile. If the integrated energy associated with this 19-element harmonic structure is greater than the integrated energy associated with the same 19-element harmonic structure during operations of the automobile when new, then the strong harmonic structure would indicate degradation in the inner wheel bearing assembly of the automobile.

4.3 Narrowband Contact Follower Processing

Narrowband processing includes detection of sets of peaks in each spectrum of a spectra-gram. Automatic determination of characteristics of persistent peaks (lines) involves automatically associating peaks in one spectrum with corresponding peaks in subsequent spectra. The process of automatically associating peaks across multiple consecutive spectra is called tracking, and the automatically associated peaks form a track. Tracks are associated with persistent peaks (lines).

Figure 9A:
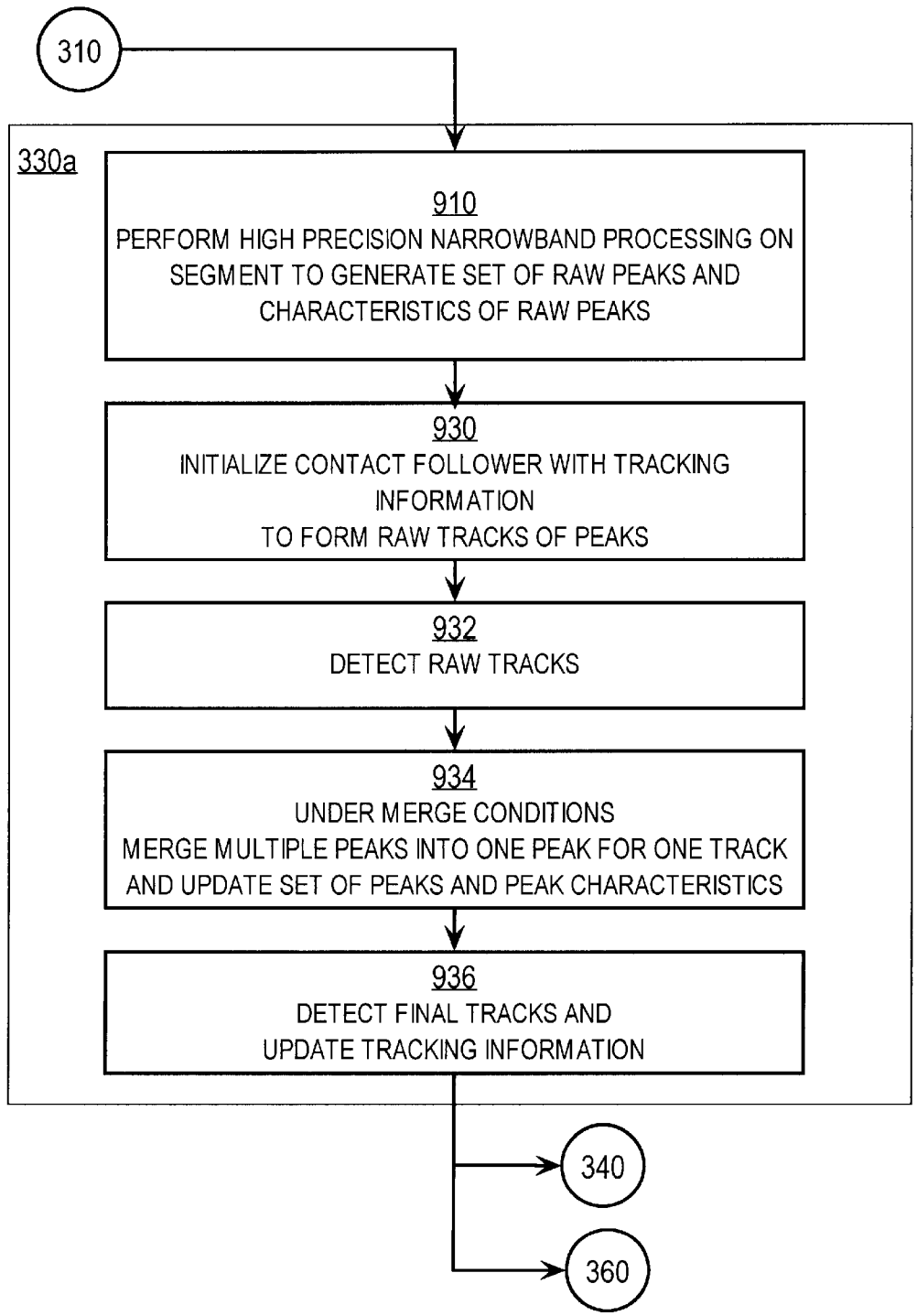
FIG. 9A is a flowchart illustrating an embodiment of a step of the method depicted in FIG. 3, which tracks peaks across multiple sequential narrowband spectra.

FIG. 9A is a flowchart illustrating an embodiment 330a of step 330 of the method depicted in FIG. 3, which automatically tracks peaks across multiple sequential narrowband spectra. In step 910, high precision narrowband processing is performed on the portions of a segment of sensor data to generate a set of raw peaks for each spectrum associated with each portion of the segment. In the illustrated embodiment, the frequency resolution of the narrowband processing is greater (smaller frequency bands) than the frequency resolution performed by one or more remote units. The higher precision narrowband processing helps to separate closely spaced harmonic lines that might not be detected in the narrowband processing performed at the remote sites. Characteristics of the peaks in the sets of peaks are also determined during step 910. For example, the number of peaks in each set is determined, the frequency of each peak in each set is determined, the prominence of each peak in each set is determined, and the spacing between peaks in each set is determined.

In steps 930, 932, 934, 936, line tracking is performed according to a particular contact follower (CF) method. The CF method employs detection rules to evaluate time-frequency cells for peaks that represent possible contacts. The CF method is accomplished with a closed-loop, interpolative, continuous gain, alpha-beta tracking methodology used effectively in passive sonar systems, and described, for example, in *"Principles of Naval Weapons Systems"* by David R. Frieden and Gene P. Bender and published in 1988 by United Sates Naval Institute, Annapolis, Md. (hereinafter Frieden). Specific steps of the CF line-tracking method include initiation, prediction, correction, and demotion. FIGS. 6A, 6B, 6C, 6D, are graphs illustrating the specific steps of automatic line tracking performed at the base unit, according to this embodiment.

Figure 6A:
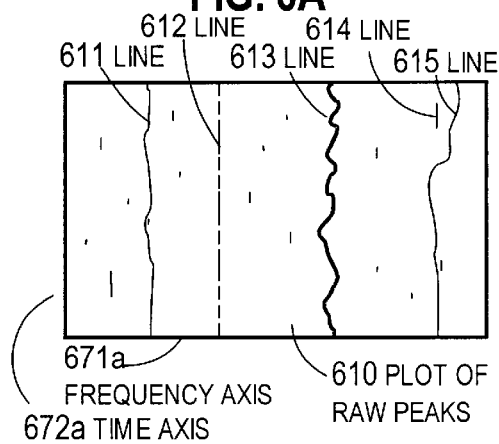
FIGS. 6A, 6B, 6C, 6D are graphs illustrating automatic line tracking at the base unit, according to an embodiment.

FIG. 6A is a graph 610 that illustrates the location in frequency-time space of the detected raw peaks in an example embodiment. The frequency axis 671a is horizontal and the time axis 672a is vertical. A human observer viewing the plot 610 of raw peaks would detect persistent peaks (lines) such as lines 611, 612, 613, 614, 615. Some lines are thin, such as lines 611 and 615; and some lines, such as line 613, are prominent. Some lines persist over a long time, such as lines 611, 613, 615. Some lines do not persist for long, such as line 614. Some lines are intermittent, such as line 612.

In step 930, a CF is initialized with a set of peaks found at the same frequency over successive time segments as depicted in FIG. 6A. The CF is initialized with a track initiation time, a track frequency, and track gates. A track gate is a change in frequency in which to look for a persistent peak in successive time segments.

Figure 6B:
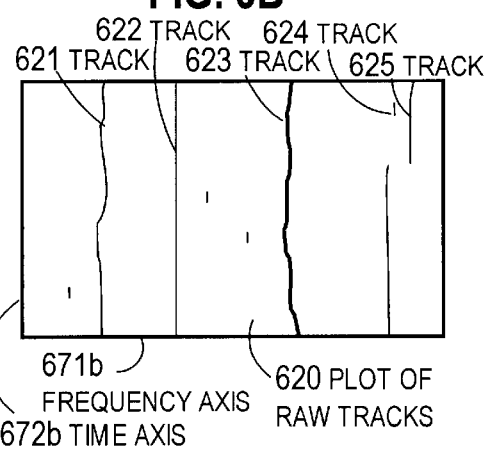

In step 932, CF detects raw tracks. FIG. 6B is a plot 620 that illustrates the location in frequency-time space of the raw tracks, in an example embodiment. The frequency axis 671a is horizontal and the time axis 672a is vertical. The raw tracks are produced as a result of the prediction and some correction stages of CF. A predicted frequency for a peak is based on the peak's frequency and change in frequency over previous portions. A persistent peak is expected in a subsequent portion within a track gate frequency change from the predicted frequency. If a peak is found within the track gate, the predicted peak is corrected based on the found peak. The found peak does not outright replace the prediction because there is noise that affects the found peak; instead, a weighted average of the predicted frequency and found frequency is used to produce the frequency for the corrected track. If no peak is found within the track gate, the prediction is used without correction and the track gates are opened up (e.g., made larger) to better find the peak in subsequent portions of the segment. If no peak is found in the next several portions, the peak is demoted in quality, and finally dropped.

It is to be noted that CF has associated the peaks that form some of the lines into tracks. In addition, some peaks that appear as dark spots or short lines in FIG. 6A are not included in FIG. 6B. Such peaks were deemed not proper tracks according to the CF for any of a variety of reasons. In some cases the peaks did not persist long enough, in some cases the peaks were not prominent enough, in some cases the peaks deviated too far in frequency, amplitude or other characteristic from the predicted peak.

It is also to be noted that CF even detects tracks based on challenging lines. For example, CF has made the intermittent line 612 into a continuous track 622; CF does not drop a track if a peak diminishes or disappears for a short time and then reappears close enough in frequency. In another example, CF reduces the fluctuations in frequency for some tracks. For example, track 623, associated in prominence and frequency with line 613, does not oscillate in frequency as much as line 613. This indicates CF damps frequency oscillations. Large amplitude oscillations may also be damped.

Figure 6C:
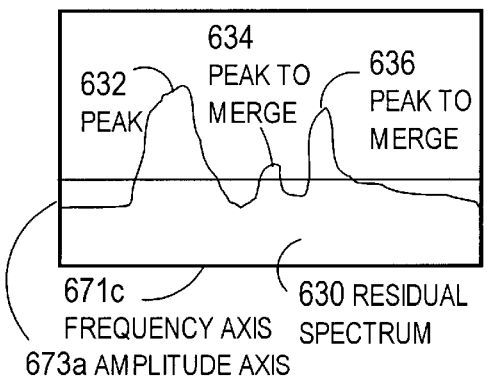
Figure 6D:
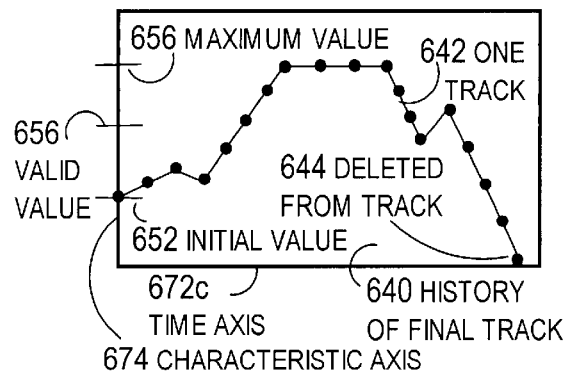

The CF mechanism for making a continuous track is illustrated with reference to FIG. 6D. FIG. 6D is a graph 640 of the history of a track in time. The track is represented by track quality curve 642 for one track. The horizontal axis is the time axis 672c and the vertical axis is a track quality measure characteristic axis 674, for some peak characteristic, such as amplitude, prominence, frequency, or spacing. For purposes of illustration, it is assumed that the characteristic axis 674 is a peak amplitude track quality axis. A valid value, for a peak amplitude quality measure to be part of a track, is indicated by the valid value tick mark 656. A peak not already associated with a track is considered part of a new track if its track quality amplitude is close to the valid value by being above an initial value indicated by the initial value tick mark 652. The track quality parameter is typically created by summing the characteristic from the last few portions of the segment to give the track some inertia. An amplitude above a maximum value, indicated by the maximum value tick mark 656 is typically due to very strong track characteristics, and the maximum value is clipped to assure that the strong tracks can be dropped in a reasonable amount of time if they were to cease. As the amplitude declines, the track quality will start to decrease (a missing peak will add zero to the track quality). At some level of decrease, the track is dropped. In some embodiments, the current track quality is used to define the track gate to be used to predict the track placement in the next portion of the segment, or the next segment.

The curve 642 is constructed as follows. The first spectra showing peaks in an appropriate frequency band that sum to a value above the initial value generate the first point on the track history curve 642 for one track. Subsequent spectra summing to characteristic values above the initial value appear as subsequent points on the curve 642. Values above the maximum are replaced by the maximum value. The track is not terminated at the first spectrum that adds so little that the characteristic value falls below the initial value. However, when a second consecutive sum falls below the initial value, the most recent spectrum is deleted from the track. For example, the characteristic 644 generated by the most recent spectrum is deleted from the curve 642 for the track. Frequency oscillations and variations in other characteristics are reduced by applying similar checks to the other characteristics of the peak considered for the track. A track may be demoted when one or several of the characteristics that describe the peaks fall outside the valid range.

If a line deviates too much in frequency in a short time, CF constructs two or more tracks. For example, the early portion of track 615 becomes track 625, but the later portion of the line is a different track.

In step 934, separate tracks that satisfy merge conditions are merged into a single track. Merging can be considered a part of the correction stage. FIG. 6C is a graph 630 of the residual spectrum for one portion of the segment. The horizontal axis is the frequency axis 671c and the vertical axis is the amplitude axis 673a. Three peaks 632, 634, 636 are evident above the threshold for detecting peaks. For purposes of illustration, it is assumed that these three peaks correspond to the tracks 623, 624, 625, respectively, on one spectrum. Peaks 634 and 636 may not really belong to separate tracks but may better be associated with a single track. Thus tracks 624 and 625 are merged based on the properties of the peaks 634, 636. Conditions for merging tracks depends on the properties of the machine being monitored.

In step 936, the final tracks and track characteristics are determined based on the merged tracks. In an embodiment, track characteristics include time, frequency, prominence, signal to noise ratio, among other characteristics. In some embodiments, values for these characteristics are reported for every point in the track curve, such as track curve 642. In some embodiments one or more statistical representations of these values are reported, such as mean, median, variance, skewness, minimum, or maximum value, or some combination, for each characteristic. The low frequency spectral variations of the characteristics may also be determined and reported. For example, one track may oscillate with a certain period long compared to the time between spectra, liked track 623; while another track may be quite stationary in time, like track 622.

Based on merging or other adaptive techniques, the track gates and other track information for the machine may be modified. The modified track information is stored for use in subsequent execution of the initialization step 930.

Steps 930 through 936 describe CF processing as performed for machinery monitoring. CF track processing for machinery monitoring may be modified from that used in passive sonar systems, as described in Frieden, cited above. In some embodiments, tracking for machine monitoring is done only in frequency, whereas, in some sonar systems, tracking is also done in bearing. In some embodiments the track gates are broader in machine monitoring to account for more variable machinery lines. In some embodiments CF merge processing is optimized for the machine and failure modes to be modified, rather than for passive sonar systems.

4.4 Classification

Figure 9B:
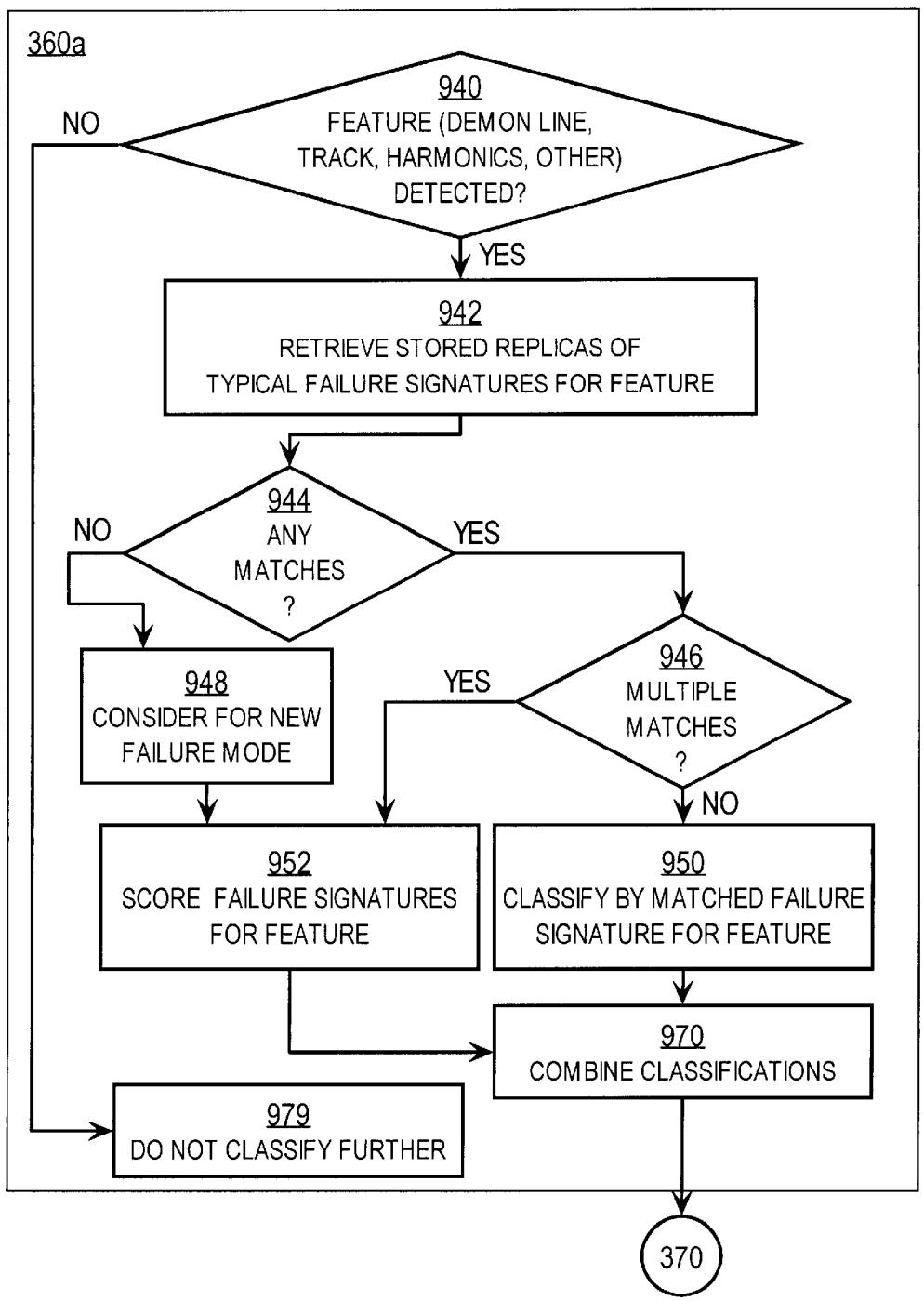
FIG. 9B is a flowchart illustrating an embodiment of a step of the method depicted in FIG. 3, which applies classification logic for deviations from normal operations.

After characteristics of peaks and tracks have been accumulated, those characteristics are used to classify machine operations into one of several classes, including a normal operations class and several failure modes classes. Each failure mode is associated with one or more defective components. Each of the classes may be defined automatically based on processing during training operations, or may be defined in concert with human analysts, or may be defined exclusively by human analysts. Any method for classifying sets of characteristic values may be used. Classification techniques know in the art are described, for example, in "Pattern Classification" by Richard O. Duda, Peter E. Hart, and David G. Stork, published in 2001 by John Wiley & Sons, New York, N.Y. (hereinafter, Duda), among others FIG. 9B is a flowchart illustrating an embodiment 360a of step 360 of the method depicted in FIG. 3, which applies classification logic for deviations from normal operations based on a group of features determined during processing on the base unit. For purposes of illustration, it is assumed that the group of features detected include a DEMON line, prominence of one or more harmonic sets, and characteristics of one or more tracks. In other embodiments, one or more of these features may be excluded or one or more other features may be added to the group of features. The features in the group may be classified in parallel or in series, and in any order. In some embodiments, the segment is initially classified in the normal operations class.

In step 940, it is determined whether a particular feature of the group of features is detected. For example, it is determined whether a DEMON line is detected. If the feature is not detected, control passes to step 979 and no classification is made. In the embodiments in which the segment is initially in the normal operations class, and the classification has not yet been changed by processing any other feature, the segment remains in the normal operations class.

If it is determined in step 940 that the feature has been detected, control passes to step 942. For example if a DEMON line is detected, control passes to step 942. In step 942 stored replicas of one or more typical failure signatures for the feature are retrieved. In some embodiments, replicas of one or more signatures for normal operations are also retrieved. For example, a DEMON line for failure of one or more components is retrieved. In some embodiments, several failure modes for the same components may be stored and apply in different operating conditions. For example, one DEMON signature for failure of an automobile engine flywheel is stored that applies when an automobile is idling and a different DEMON line signature for failure of the flywheel is stored that applies when the automobile is accelerating. In some embodiments, other data, such as speed history data, sent in the message from the remote unit is used to determine which replica to use.

In step 944, it is determined whether any matches are found between the feature for the current segment and the replicas. If no match is found, control passes to step 948 to consider the signature of the feature in the current segment as an example of a new class representing a new failure mode. In embodiments that do not learn from operations, step 948 may be omitted and control passes to step 979 to not further classify the current segment.

If a match is found during step 944, control passes to step 946. In step 946, it is determined whether multiple matches were found. If not, then only one match is found; and control passes to step 950 to classify the segment into the class associated with the failure signature of the one match. Control then passes to step 970 to combine this classification with information obtained by classifying the segment according to other features, such as track characteristics and harmonic structure. In some embodiments, the classification is given a weight to be used in combining the classification with any other classifications.

If it is determined in step 946 that multiple matches are found, then control passes to step 952 to determine a score for each failure signature or normal operation signature that matches. Control then flows to step 970 to combine these scores with information obtained by classifying the segment according to other features, such as track characteristics and harmonic structure. In embodiments that learn from operations, any new signatures are also scored, or passed through un-scored to step 970 as candidate new classes of normal or degraded operations.

In step 970 important processing clues, including scored matched signatures and other information sent in the message from the remote unit are combined into a coherent scoring of a segment into a maintenance service action or a false alarm (normal operation class). In some embodiments, if matches to failure modes are found among more than one feature, then an alert is formed to report a maintenance service action.

4.5 Alerting

An alert indicating the occurrence of deviations classified as one or more conditions for maintenance is sent, as described above in step 380. In some embodiments, the alert is sent in a message along with other information, such as data indicating the classification and the component part whose failure is associated with the classification.

In some embodiments, a warning is sent when persistent deviations are found that do not match any signatures in the database of known failure modes. A human analyst can determine whether to add the new signature as a new failure mode associated with one or more components.

An operator need not interact with the base unit. A failure alert message, including data indicating the components and other information associated with a matched failure mode, is sent to the alert unit. The alert unit may be an off site unit, such as a cell phone, pager, or client computer on network 140. In some embodiments, an alert unit is included in the base unit. An operator may read alert messages on the base unit including information describing why a machine maintenance service alert has been declared. An operator may also use the base unit to monitor the health and status of the remote units.

The illustrated embodiments of the present invention allow an automated system to monitor machinery and detect the onset of conditions that call for servicing one or more components of the machinery. In particular, the illustrated embodiments allow detection of problems developing even in minor components of complex machinery, before substantial, expensive-to-repair damage is wreaked on the complex machine. These sophisticated techniques also reduce false alarms caused by clutter such as random peaks, compared to other techniques for monitoring machines.

5. Automobile Example

In an example embodiment, a system is emplaced for determining failure of a four wheel drive light truck. In this embodiment, a remote unit includes a processor and data and links to nine (9) accelerometers, as well as connections to existing on-board sensors. The nine accelerometers are located as follows, four (4) in the vicinity of the four wheels, one at each wheel, two (2) in the vicinity of the two differentials, one at each, one (1) on the transmission, and two (2) on the engine. The on-board sensors also connected to the processor include the engine temperature gauge, the tachometer to measure engine revolutions per minute, antilock breaking system outputs, and the onboard computer diagnostic outputs.

The accelerometers are processed both at the remote unit and at the base unit for a frequency range as if the accelerometers were acoustic microphones. Accelerometers have an advantage over microphones in that the accelerometers do not pick up interference from road nose and other external entities.

FIG. 1B shows the narrowband spectra-grams 170 for the accelerometer data from the right rear wheel. Spectra-gram 170*a* is for degraded operations due to a worn inside bearing, and spectra-gram 170*b* is for normal operations after the worn inside bearing has been replaced. The broadband noise of spectra-gram 170*a* is greater than the broadband noise of spectra-gram 170*b* due to the extra prominent lines marked deviations 181, 182, 183, 184. It is assumed for purposes of illustration that the increase in broadband noise causes the remote unit to process the segment associated with spectra-gram 170*a* in steps 220 through 240 of FIG. 2.

It is further assumed for illustration, that the narrowband processing performed in the remote unit at step 230, determines that there are peaks at the marked deviations. In step 250 it is determined that the peaks represent a fault that requires further analysis at a base unit. For example, in step 552, the remote unit determines that there are two peaks above the mid frequencies in the segment associated with spectra-gram 170*a*. In step 554, the remote unit retrieves saved properties for normal operations and determines that there are no peaks above the mid frequencies in the saved properties. In step 562, the remote unit determines a large fault score for the number of lines in the segment of spectra-gram 170*a*. Because the peaks are prominent, the remote unit also determines a large fault score for the prominence of peaks in step 566. When the fault scores are combined in step 570, a large combined fault score results. For purposes of illustration, it is assumed that, in step 580, the large combined fault score exceeds the threshold, and control passes to step 260 to prepare and send a message to the base unit.

At the base unit, higher precision narrowband processing is performed, for example, in step 330. It is assumed for purposes of illustration that the spectra-gram 810 is produced during step 330 at the base unit, as shown in FIG. 8. Spectra-gram 810 resolves the harmonic lines with spacing 830. It is assumed, for purposes of illustration that frequency bands with such small spacing are not resolved at the remote unit. It is also assumed that, during step 340, the integrated energy in the 14 harmonic bands of the outer wheel bearing and the integrated energy in the 19 harmonic bands of the inner wheel bearing are computed, among other harmonic components relevant to the light truck.

During step 360*a*, shown in FIG. 9B, the feature detected is the integrated energy in the 19 harmonic bands. In step 942, the stored value of the integrated energy is retrieved for both normal conditions and for operations with worn cage and bearings. It is assumed for purposes of illustration, that in step 944 the value of the integrated energy of the current segment is found to match the range of integrated energies associated with worn inner wheel bearings. As a result, in step 950, the segment is classified as matching the signature of worn inner bearings. In step 970, this classification is combined with other classifications based on other features. It is assumed for purposes of illustration, that the only other classification matches found are for normal operations. Thus no other classifications are combined.

In step 370, it is determined that the combined classification indicates that the conditions for performing maintenance on the inner wheel bearing of the passenger side rear wheel are met. Control passes to step 380; and an alert message is generated indicating that the inner wheel bearing should have maintenance performed, such as lubrication, repair, or replacement.

6. Computer Implementation Hardware Overview

Figure 10:
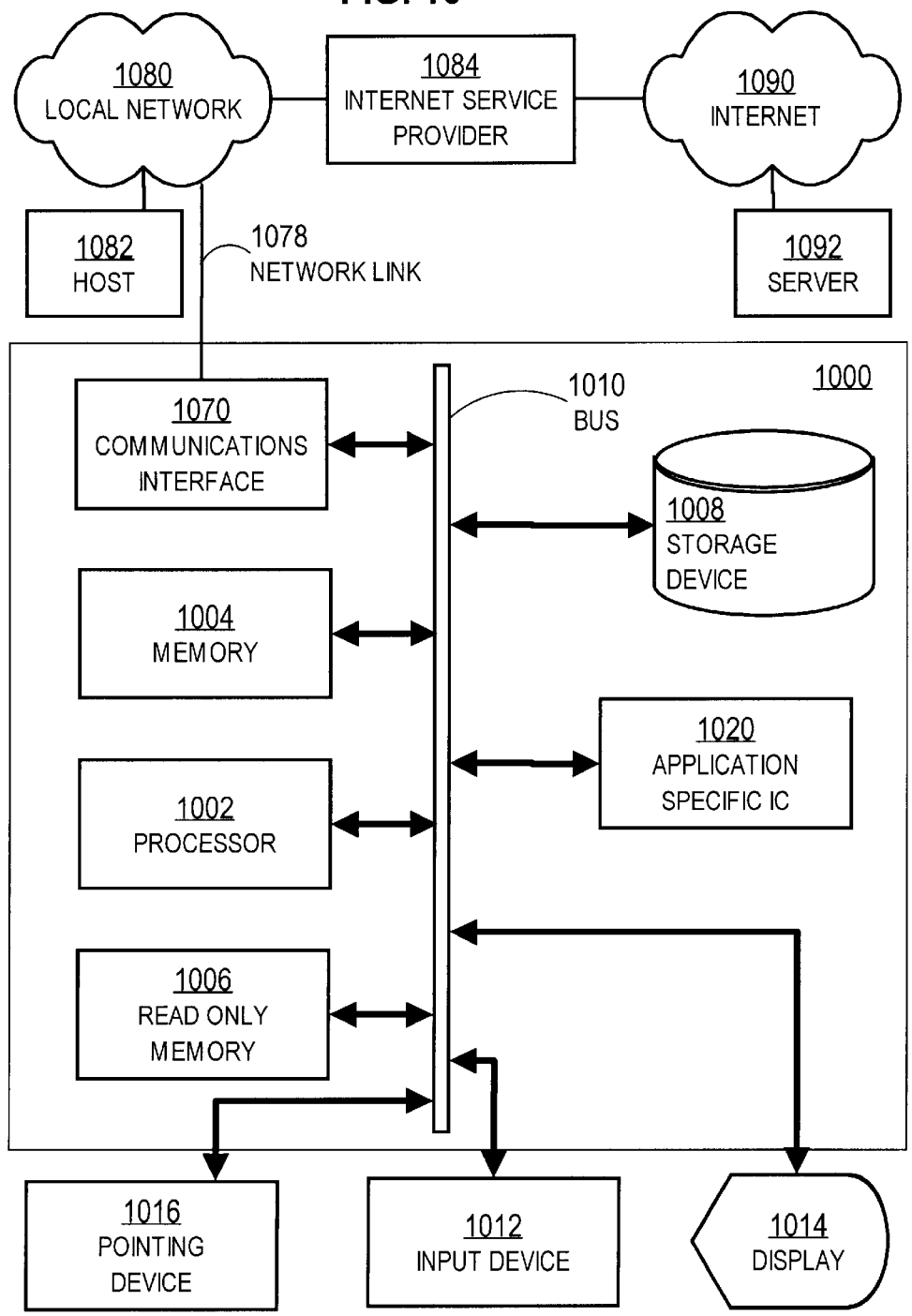
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitute computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 1002 for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, which carry information to and from computer system 1000, are exemplary forms of carrier waves. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to an infra-red signal, a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

6. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of monitoring a machine for significant deviations from normal operations, the method comprising the steps of:

collecting, at a first processing element, sensor data about the machine;

performing narrowband frequency domain processing by the first processing element to determine a segment of sensor data that indicates a deviation from normal operations that exceeds a threshold deviation;

sending a message including the segment of sensor data to a second processing element;

in response to receiving the message, performing different narrowband frequency domain processing at the second processing element to determine whether the deviation from normal operations is significant for maintaining the machine; and if the deviation from normal operations is determined to be significant for maintaining the machine, then reporting the deviation to cause the machine to be maintained.

2. A method of monitoring a machine for significant deviations from normal operations, the method comprising the steps of:

receiving at a first processing element a message including a segment of sensor data about the machine from a second processing element, which segment is determined at the second processing element to indicate a deviation from normal operations that exceeds a threshold deviation;

in response to receiving the message, performing on the segment of sensor data, at the first processing element, first narrowband frequency domain processing to determine whether the deviation from normal operations is significant for maintaining the machine, the narrowband frequency domain processing different from second processing performed in the second processing element; and if the deviation from normal operations is determined to be significant for maintaining the machine, then reporting the deviation to cause the machine to be maintained, wherein narrowband frequency domain processing includes:

normalizing a frequency spectrum for a temporal portion of sensor data, which includes determining a broad background spectrum and removing the broad background spectrum from the frequency spectrum to produce a residual spectrum; and determining in the residual spectrum a peak set of one or more spectral peaks that exceed a threshold amplitude.

3. A method as recited in claim 2, said step of performing first narrowband frequency domain processing further comprising the step of determining a first residual spectrum for a first temporal portion of the segment of sensor data with a finer frequency resolution than a second residual spectrum determined for the first temporal portion during the second processing performed in the second processing element.

4. A method as recited in claim 2, said step of performing first narrowband frequency domain processing further comprising the steps of:

dividing the segment of sensor data into a plurality of temporal portions;

determining a first plurality of peak sets in a corresponding plurality of residual spectra for the corresponding plurality of temporal portions; and determining a track of related peaks having one peak from each peak set of a second plurality of peak sets of the first plurality of peak sets.

5. A method as recited in claim 4, said step of determining a track of related peaks further comprising the step of merging a plurality of adjacent peaks in a peak set into a single peak.

6. A method as recited in claim 2, said step of performing first narrowband frequency domain processing further comprising the step of performing modulated source processing to extract a low frequency signal that modulates a broadband signature of sensor data from the machine.

7. A method as recited in claim 2, the method further comprising the step of performing directional processing to determine a direction along which a signal propagates from a component of the machine to a sensor that generates the sensor data.

8. A method as recited in claim 4, said step of performing first narrowband frequency domain processing further comprising the steps of:

determining a set of one or more values for a set of one or more characteristics of the track; and determining whether the deviation from normal operations is significant for maintaining the machine based at least in part on the set of one or more values.

9. A method as recited in claim 8, said step of determining whether the deviation from normal operations is significant for maintaining the machine further comprising the step of comparing the set of one or more values of the track to a reference set of one or more values for the set of one or more characteristics of a corresponding track found during normal operation of the machine.

10. A method as recited in claim 8, said step of determining whether the deviation from normal operations is significant for maintaining the machine further comprising the step of comparing the set of one or more values of the track to a reference set of one or more values for the set of one or more characteristics of a corresponding track found during operation of the machine when maintenance should be performed on a component of the machine.

11. A method as recited in claim 2, said step of performing first narrowband frequency domain processing further comprising determining a harmonic set of peaks in the peak set, each peak in the harmonic set separated in frequency from a lowest frequency peak in the harmonic set by an integer multiple of a constant frequency difference.

12. A method as recited in claim 2, said step of performing first narrowband frequency domain processing further comprising;
   determining for the segment a set of one or more values for a set of one or more characteristics of the segment;
   classifying the segment into a particular mode of a plurality of component maintenance modes based at least in part on the set of one or more values, each component maintenance mode associated with a component of the machine and an indication of maintenance to be performed; and
   determining whether the deviation from normal operations is significant at least in part based on the particular mode into which the segment is classified.

13. A method as recited in claim 2, said step of performing first narrowband frequency domain processing further comprising:
   determining a first numeric score based on a first set of one or more frequency domain characteristics of the segment;
   determining a second numeric score based on a second set of one or more frequency domain characteristics of the segment; and
   determining whether the deviation from normal operations is significant at least in part based on a sum of the first numeric score and the second numeric score.

14. A method as recited in claim 2, wherein the sensor data is vibration data.

15. A method of monitoring a machine for significant deviations from normal operations, the method comprising the steps of:
   collecting, at a first processing element, sensor data about the machine;
   performing first narrowband frequency domain processing on the first processing element to determine a segment of sensor data that indicates a deviation from normal operations that exceeds a threshold deviation; and
   sending a message including the segment of sensor data to a second processing element for performing different second narrowband frequency domain processing to determine whether the deviation from normal operations is significant for maintaining the machine,
   wherein narrowband frequency domain processing includes:
      normalizing a frequency spectrum for a temporal portion of sensor data, which includes determining a broad background spectrum and removing the broad background spectrum from the frequency spectrum to produce a residual spectrum; and
      determining in the residual spectrum a peak set of one or more spectral peaks that exceed a threshold amplitude.

16. A method as recited in claim 15, said step of performing the first narrowband frequency domain processing further comprising the step of determining a first residual spectrum for a first temporal portion of the segment of sensor data with a coarser frequency resolution than a second residual spectrum determined for the first temporal portion during the second processing performed in the second processing element.

17. A method as recited in claim 15, said step of performing the first narrowband frequency domain processing further comprising the steps of:
   determining a set of one or more values for a set of one or more characteristics of the peak set for the segment; and
   determining whether the segment indicates a deviation from normal operations based at least in part on the set of one or more values.

18. A method as recited in claim 17, said step of determining a set of one or more values for a set of one or more characteristics of the peak set for the segment including determining a set of values for at least one of a number of peaks in the peak set, a set of frequencies associated with the one or more peaks in the peak set, and a set of indications of amplitudes associated with the one or more peaks in the peak set.

19. A method as recited in claim 17, said step of determining a set of one or more values for a set of one or more characteristics of the peak set for the segment including determining a set of values for spacing between neighboring peaks in the peak set.

20. A method as recited in claim 17, said step of determining whether the segment indicates a deviation from normal operations further comprising the step of comparing the set of one or more values for the peak set to a reference set of one or more values for the set of one or more characteristics of a peak set found during normal operation of the machine.

21. A method as recited in claim 17, said step of determining whether the segment indicates a deviation from normal operations further comprising the step of comparing the set of one or more values for the peak set to a reference set of one or more values for the set of one or more characteristics of a peak set found during operation of the machine when maintenance should be performed on a component of the machine.

22. A method as recited in claim 19, said step of performing first narrowband frequency domain processing further comprising determining a harmonic set of peaks in the peak set, each peak in the harmonic set separated in frequency from a lowest frequency peak in the harmonic set by an integer multiple of a constant frequency difference.

23. A method as recited in claim 15, said step of performing first narrowband frequency domain processing further comprising;
   determining for the segment a set of one or more values for a set of one or more characteristics of the segment;
   classifying the segment into a particular mode of a plurality of deviation modes based at least in part on the set of one or more values, each deviation mode associated with a deviation from normal operation of the machine; and
   determining whether the segment indicates a deviation from normal operations at least in part based on the particular mode into which the segment is classified.

24. A method as recited in claim 15, said step of performing first narrowband frequency domain processing further comprising:
   determining a first numeric score based on a first set of one or more frequency domain characteristics of the segment;
   determining a second numeric score based on a second set of one or more frequency domain characteristics of the segment; and
   determining whether the segment indicates a deviation from normal operations at least in part based on a sum of the first numeric score and the second numeric score.

25. A method as recited in claim 15, wherein the sensor data is vibration data.

26. A computer-readable medium carrying one or more sequences of instructions for monitoring a machine for significant deviations from normal operations, wherein execution of the one or more sequences of instructions by one or more processors causes the one or more processors to perform the steps of:
- receiving a message including a segment of sensor data about the machine from a second processor, which segment is determined at the second processor to indicate a deviation from normal operations that exceeds a threshold deviation;
- in response to receiving the message, performing on the segment of sensor data first narrowband frequency domain processing to determine whether the deviation from normal operations is significant for maintaining the machine, the narrowband frequency domain processing different from second processing performed in the second processor; and
- if the deviation from normal operations is determined to be significant for maintaining the machine, then reporting the deviation to cause the machine to be maintained,
- wherein narrowband frequency domain processing includes:
  - normalizing a frequency spectrum for a temporal portion of sensor data, which includes determining a broad background spectrum and removing the broad background spectrum from the frequency spectrum to produce a residual spectrum; and
  - determining in the residual spectrum a peak set of one or more spectral peaks that exceed a threshold amplitude.

27. A computer-readable medium carrying one or more sequences of instructions for monitoring a machine for significant deviations from normal operations, wherein execution of the one or more sequences of instructions by one or more processors causes the one or more processors to perform the steps of:
- collecting sensor data about the machine;
- performing first narrowband frequency domain processing to determine a segment of sensor data that indicates a deviation from normal operations that exceeds a threshold deviation; and
- sending a message including the segment of sensor data to a second processor for performing different second narrowband frequency domain processing to determine whether the deviation from normal operations is significant for maintaining the machine,
- wherein narrowband frequency domain processing includes:
  - normalizing a frequency spectrum for a temporal portion of sensor data, which includes determining a broad background spectrum and removing the broad background spectrum from the frequency spectrum to produce a residual spectrum; and
  - determining in the residual spectrum a peak set of one or more spectral peaks that exceed a threshold amplitude.

28. An apparatus for monitoring a machine for significant deviations from normal operations, comprising:
- a communications port for receiving messages;
- a computer-readable medium storing one or more sequences of instructions; and
- a processor connected to the communications port and computer readable medium,
- wherein execution of the one or more sequences of instructions by the processor causes the processor to perform the steps of:
  - receiving a message including a segment of sensor data about the machine from a second processor, which segment is determined at the second processor to indicate a deviation from normal operations that exceeds a threshold deviation;
  - in response to receiving the message, performing on the segment of sensor data first narrowband frequency domain processing to determine whether the deviation from normal operations is significant for maintaining the machine, the narrowband frequency domain processing different from second processing performed in the second processor; and
  - if the deviation from normal operations is determined to be significant for maintaining the machine, then reporting the deviation to cause the machine to be maintained,
- wherein narrowband frequency domain processing includes:
  - normalizing a frequency spectrum for a temporal portion of sensor data, which includes determining a broad background spectrum and removing the broad background spectrum from the frequency spectrum to produce a residual spectrum; and
  - determining in the residual spectrum a peak set of one or more spectral peaks that exceed a threshold amplitude.

29. An apparatus for monitoring a machine for significant deviations from normal operations, comprising:
- a communications port for sending messages;
- a sensor for generating sensor data about the machine;
- a computer-readable medium storing one or more sequences of instructions; and
- a processor connected to the communications port, the sensor and the computer readable medium, wherein execution of the one or more sequences of instructions by the processor causes the processor to perform the steps of:
  - collecting sensor data about the machine from the sensor;
  - performing first narrowband frequency domain processing to determine a segment of sensor data that indicates a deviation from normal operations that exceeds a threshold deviation; and
  - sending a message including the segment of sensor data to a second processor for performing different second narrowband frequency domain processing to determine whether the deviation from normal operations is significant for maintaining the machine,
- wherein narrowband frequency domain processing includes:
  - normalizing a frequency spectrum for a temporal portion of sensor data, which includes determining a broad background spectrum and removing the broad background spectrum from the frequency spectrum to produce a residual spectrum; and
  - determining in the residual spectrum a peak set of one or more spectral peaks that exceed a threshold amplitude.

30. An apparatus for monitoring a machine for significant deviations from normal operations, comprising:
- means for receiving a message including a segment of sensor data about the machine from a second processor, which segment is determined at the second processor to indicate a deviation from normal operations that exceeds a threshold deviation;

means for performing on the segment of sensor data, in response to receiving the message, first narrowband frequency domain processing to determine whether the deviation from normal operations is significant for maintaining the machine, the narrowband frequency domain processing different from second processing performed in the second processor; and means for reporting the deviation to cause the machine to be maintained, if the deviation from normal operations is determined to be significant for maintaining the machine, wherein narrowband frequency domain processing includes:

normalizing a frequency spectrum for a temporal portion of sensor data, which includes determining a broad background spectrum and removing the broad background spectrum from the frequency spectrum to produce a residual spectrum; and determining in the residual spectrum a peak set of one or more spectral peaks that exceed a threshold amplitude.

31. An apparatus for monitoring a machine for significant deviations from normal operations, comprising:

means for collecting sensor data about the machine;

means for performing first narrowband frequency domain processing to determine a segment of sensor data that indicates a deviation from normal operations that exceeds a threshold deviation; and means for sending a message including the segment of sensor data to a second processor for performing different second narrowband frequency domain processing to determine whether the deviation from normal operations is significant for maintaining the machine, wherein narrowband frequency domain processing includes:

normalizing a frequency spectrum for a temporal portion of sensor data, which includes determining a broad background spectrum and removing the broad background spectrum from the frequency spectrum to produce a residual spectrum; and determining in the residual spectrum a peak set of one or more spectral peaks that exceed a threshold amplitude.

32. A system for monitoring a machine for significant deviations from normal operations, comprising:

a communications channel;

a remote unit connected to the communications channel, the remote unit including:

a first communications port for sending messages over the communications channel;

a sensor for generating sensor data about the machine;

a first computer-readable medium storing a first set of one or more sequences of instructions and first data indicating sensor data during at least one of normal operations of the machine and operations when the machine should be maintained; and a first processor connected to the communications port, the sensor and the computer readable medium, wherein execution of the first set of instructions by the first processor causes the first processor to perform the steps of collecting sensor data about the machine from the sensor, performing first narrowband frequency domain processing to determine a segment of sensor data that indicates a deviation from normal operations that exceeds a threshold deviation, and sending a message including the segment of sensor data; and a base unit connected to the communications channel, the base unit including:

a second communications port for receiving messages over the communications channel;

a second computer-readable medium storing a second set of one or more sequences of instructions and second data indicating sensor data during at least one of normal operations of the machine and during operations when the machine should be maintained; and a second processor connected to the communications port and the computer readable medium, wherein execution of the second set of instructions by the second processor causes the second processor to perform the steps of:

receiving the message, in response to receiving the message, performing different narrowband frequency domain processing to determine whether the deviation from normal operations is significant for maintaining the machine, and reporting the deviation to cause the machine to be maintained, if the deviation from normal operations is determined to be significant for maintaining the machine.

33. A system for monitoring a machine for significant deviations from normal operations, comprising:

means for collecting, at a first processing element, sensor data about the machine;

means for performing narrowband frequency domain processing on the first processing element to determine a segment of sensor data that indicates a deviation from normal operations that exceeds a threshold deviation;

means for sending a message including the segment of sensor data to a more powerful second processing element;

means for performing different narrowband frequency domain processing, at the second processing element in response to receiving the message, to determine whether the deviation from normal operations is significant for maintaining the machine; and means for reporting the deviation to cause the machine to be maintained, if the deviation from normal operations is determined to be significant for maintaining the machine.

* * * * *